United States Patent
Nassar

(10) Patent No.: US 12,389,483 B2
(45) Date of Patent: Aug. 12, 2025

(54) METHOD AND APPARATUS FOR RELAYED CONNECTION BETWEEN NODES

(71) Applicant: Nokia Technologies Oy, Espoo (FI)

(72) Inventor: Mohamed Amin Nassar, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/955,764

(22) Filed: Nov. 21, 2024

(65) Prior Publication Data

US 2025/0089114 A1   Mar. 13, 2025

Related U.S. Application Data

(63) Continuation of application No. PCT/EP2024/052335, filed on Jan. 31, 2024.

(30) Foreign Application Priority Data

Feb. 17, 2023   (GB) ..................... 2302261

(51) Int. Cl.
| | |
|---|---|
| H04W 4/00 | (2018.01) |
| H04W 8/00 | (2009.01) |
| H04W 36/08 | (2009.01) |
| H04W 76/14 | (2018.01) |
| H04W 76/18 | (2018.01) |

(52) U.S. Cl.
CPC ........... *H04W 76/18* (2018.02); *H04W 8/005* (2013.01); *H04W 36/08* (2013.01); *H04W 76/14* (2018.02)

(58) Field of Classification Search
CPC ...... H04W 76/18; H04W 76/14; H04W 8/005
USPC ........................................................ 370/329
See application file for complete search history.

(56) References Cited

U.S. PATENT DOCUMENTS

| | | | | |
|---|---|---|---|---|
| 10,433,286 | B2 * | 10/2019 | Nair | H04B 7/15528 |
| 10,893,557 | B2 * | 1/2021 | Gulati | H04B 7/15542 |
| 11,026,285 | B2 * | 6/2021 | Kreiner | H04W 24/04 |
| 11,700,565 | B2 * | 7/2023 | Hampel | H04W 36/305 |
| | | | | 370/227 |
| 11,743,910 | B2 * | 8/2023 | Lee | H04W 72/23 |
| | | | | 370/329 |
| 11,903,058 | B2 * | 2/2024 | Cheng | H04W 76/27 |

(Continued)

FOREIGN PATENT DOCUMENTS

| | | |
|---|---|---|
| EP | 2252009 A1 | 11/2010 |
| WO | 2021/207505 A1 | 10/2021 |

(Continued)

OTHER PUBLICATIONS

"3rd Generation Partnership Project; Technical Specification Group Core Network and Terminals; Proximity-services (ProSe) in 5G System (5GS) protocol aspects; Stage 3 (Release 17)", 3GPP TS 24.554, V17.3.0, Dec. 2022, pp. 1-371.

(Continued)

*Primary Examiner* — Marceau Milord
(74) *Attorney, Agent, or Firm* — Nokia Technologies Oy

(57) ABSTRACT

Techniques for relayed connection between nodes are provided. For example, a method for relayed connection between nodes comprises sending, from a source node to a relay node, a communication request message for establishing a connection to a target node via the relay node; and receiving, at the source node from the relay node, a communication reject message indicating a rejection to establish the connection by the target node.

13 Claims, 15 Drawing Sheets

(56) References Cited

U.S. PATENT DOCUMENTS

| | | | |
|---|---|---|---|
| 11,910,457 B2* | 2/2024 | Chen | H04W 76/18 |
| 2004/0208162 A1* | 10/2004 | Bergmann | H04L 45/22 |
| | | | 370/351 |
| 2018/0020442 A1* | 1/2018 | Nair | H04W 12/04 |
| 2018/0324882 A1* | 11/2018 | Gulati | H04B 7/15542 |
| 2019/0223008 A1* | 7/2019 | Vanderveen | H04L 63/061 |
| 2020/0178343 A1* | 6/2020 | Kim | H04W 76/27 |
| 2020/0252989 A1* | 8/2020 | Chen | H04W 76/19 |
| 2020/0323012 A1* | 10/2020 | Kreiner | H04W 76/19 |
| 2020/0383166 A1* | 12/2020 | Venkataraman | H04W 76/30 |
| 2021/0051758 A1* | 2/2021 | Xu | H04W 76/27 |
| 2021/0337588 A1* | 10/2021 | Lee | H04W 72/23 |
| 2021/0400745 A1* | 12/2021 | Kuo | H04W 80/02 |
| 2022/0053449 A1* | 2/2022 | Shan | H04W 36/0066 |
| 2022/0053585 A1* | 2/2022 | Wang | H04W 8/005 |
| 2023/0077496 A1* | 3/2023 | Cheng | H04W 76/27 |
| | | | 370/328 |
| 2023/0087258 A1* | 3/2023 | Lu | H04W 40/12 |
| | | | 370/328 |
| 2023/0337301 A1* | 10/2023 | Guo | H04W 76/14 |
| 2023/0371094 A1* | 11/2023 | Xu | H04W 76/14 |
| 2024/0147328 A1* | 5/2024 | Kim | H04W 36/08 |
| 2024/0236789 A1* | 7/2024 | Wu | H04W 36/033 |

FOREIGN PATENT DOCUMENTS

| | | |
|---|---|---|
| WO | 2022/083546 A1 | 4/2022 |
| WO | 2022/236631 A1 | 11/2022 |

OTHER PUBLICATIONS

"3rd Generation Partnership Project; Technical Specification Group Services and System Aspects; Proximity based Services (ProSe) in the 5G System (5GS) (Release 18)", 3GPP TS 23.304, V18.0.0, Dec. 2022, pp. 1-122.

"Using the 5G ProSe direct link establishment procedure for UE-to-UE relay—Rejection scenarios", 3GPP TSG-CT WG1 Meeting #140, C1-23xxxx, Nokia, Feb. 27-Mar. 3, 2023, 5 pages.

"Using the 5G ProSe direct link modification procedure for UE-to-UE relay—Rejection scenarios", 3GPP TSG-CT WG1 Meeting #140, C1-23xxxx, Nokia, Feb. 27-Mar. 3, 2023, 5 pages.

Search Report received for corresponding United Kingdom Patent Application No. 2302261.9, dated Aug. 24, 2023, 3 pages.

International Search Report and Written Opinion received for corresponding Patent Cooperation Treaty Application No. PCT/EP2024/052335, dated Apr. 9, 2024, 16 pages.

"5G; Proximity-services (ProSe) in 5G System (5GS) protocol aspects; Stage 3 (3GPP TS 24.554 version 17.2.1 Release 17)", ETSI TS 124 554, V17.2.1, Oct. 2022, 371 pages.

* cited by examiner

METHOD AND APPARATUS FOR RELAYED CONNECTION BETWEEN NODES

TECHNICAL FIELD

The subject disclosure generally relates to wireless communication systems and more particularly, to wireless communication systems allowing connections between nodes via relay nodes. Yet more particularly, the subject disclosure provides methods and apparatuses of relayed connection between nodes.

BACKGROUND

Wireless telecommunication systems are under constant development. There is a need for higher data rates and high quality of service. Reliability requirements are constantly rising and ways and means to ensure reliable connections and data traffic while keeping transmission delays minimal are constantly under development.

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. Besides the typical mobile broadband use case, NR is being developed to also support Machine Type Communication (MTC), Ultra Reliable Low Latency Communication (URLCC), side-link device-to-device (D2D) and other use cases.

SUMMARY

It is an object of the subject disclosure to provide a mechanism contributing to improve relayed connection between nodes in a network, thereby improving direct communication services. There are provided methods and apparatuses of relayed connection between nodes to improve the direct communication services.

According to a first aspect of the subject disclosure, a method for relayed connection between nodes is provided. The method comprises sending, from a source node to a relay node, a communication request message for establishing connection to a target node via the relay node; and receiving, at the source node from the relay node, a communication reject message indicating a rejection to establish connection by the target node.

In some examples of the first aspect, the method further comprises, responsive to receiving the communication reject message, retrying to establish the connection to the target node by sending, from the source node to the relay node, another communication request message for establishing connection to the target node via the relay node.

In some examples of the first aspect, the method further comprises, responsive to receiving the communication reject message, starting a timer; and sending the other communication request message responsive to lapse of the timer.

In some examples of the first aspect, the method further comprises, responsive to receiving the communication reject message, performing a relay reselection procedure to select another relay node; and sending, from the source node to the other relay node, a communication request message for establishing connection to the target node via the other relay node.

In some examples of the first aspect, the method further comprises, responsive to receiving the communication reject message, determining whether the rejection by the target node is permanent, and responsive to determining that the rejection is permanent, performing a discovery procedure to discover another target node with which to establish connection via the relay node or another relay node.

In some examples of the first aspect, the method further comprises sending, from the source node to the relay node, a communication request message for modifying an existing connection to the relay node to establish connection to the target node; and receiving, at the source node from the relay node, a communication reject message indicating a rejection to modify the existing connection due to rejection to establish the connection by the target node.

In some examples of the first aspect, the method further comprises sending, from the source node to the relay node, a communication request message for establishing a connection to the target node, by modifying an existing connection between the relay node and the target node; and receiving, at the source node from relay node, a communication reject message indicating a rejection to establish the connection between source node and relay node due to rejection to modify the existing connection between the relay node and the target node.

In some examples of the first aspect, the communication reject message indicating the rejection to modify the connection comprises identification information indicating the source node and/or identification information indicating the target node.

In some examples of the first aspect, the method further comprises deriving, based on the identification information indicating the target node, the target node among a plurality of target nodes with which the source node is trying to connect causing the rejection.

In some examples of the first aspect, the communication request message for modifying the connection comprises a PROSE DIRECT LINK MODIFICATION REQUEST message and/or wherein the communication reject message indicating the rejection to modify connection comprises a PROSE DIRECT LINK MODIFICATION REJECT message.

In some examples of the first aspect, the communication reject message comprises one or more cause values indicating that the rejection is due to rejection by the target node.

In some examples of the first aspect, the one or more cause value are included in an existing information element for signaling cause values of the relay node in the communication reject message.

In some examples of the first aspect, the communication reject message comprises an additional information element for signaling cause values of the target node.

In some examples of the first aspect, the communication request message for establishing connection comprises a PROSE DIRECT LINK ESTABLISHMENT REQUEST message and/or wherein the communication reject message indicating the rejection to establish connection comprises a PROSE DIRECT LINK ESTABLISHMENT REJECT message.

In some examples of the first aspect, the communication reject message indicates a rejection by one or more second relay nodes via which the source node is to connect to the target node.

In some examples of the first aspect, the communication reject message comprises one or more cause values indicating that the rejection is due to rejection by a second relay node among the one or more second relay nodes.

In some examples of the first aspect, the one or more cause value are included in an existing information element for signaling cause values of the relay node in the communication reject message.

In some examples of the first aspect, the communication reject message comprises an additional information element for signaling cause values of the second relay node.

In some examples of the first aspect, the source node comprises a user equipment (UE).

According to a second aspect of the subject disclosure, a method for relayed connection between nodes is provided. The method comprises sending, from a source node to a relay node, a communication request message for modifying an existing connection to the relay node to establish connection to the target node via the relay node; and receiving, at the source node from the relay node, a communication reject message indicating a rejection to modify the existing connection due to rejection to establish the connection by the target node.

In some examples, the method according to the second aspect comprises one or more of the examples of the method according to the first aspect as outlined above.

According to a third aspect of the subject disclosure, a method for relayed connection between nodes is provided. The method comprises sending, from a source node to a relay node, a communication request message for establishing a connection to a target node via the relay node, by modifying an existing connection between the relay node and the target node; and receiving, at the source node from relay node, a communication reject message indicating a rejection to establish the connection between source node and relay node due to rejection to modify the existing connection between the relay node and the target node.

In some examples, the method according to the third aspect comprises one or more of the examples of the method according to the first aspect as outlined above.

According to a fourth aspect of the subject disclosure, a method for relayed connection between nodes is provided. The method comprises receiving, at a relay node from a source node, a communication request message for establishing connection to a target node via the relay node; establishing the connection to the target node; and responsive to receiving a rejection to establish the connection by the target node, sending, from the relay node to the source node, a communication reject message indicating the rejection to establish connection by the target node.

In some examples of the third aspect, the method further comprises receiving, at the relay node from the source node, a communication request message for modifying an existing connection to the relay node to establish connection to the target node; and, responsive to receiving a rejection to establish the connection by the target node, sending, from the relay node to the source node, a communication reject message indicating a rejection to modify the existing connection due to rejection to establish the connection by the target node.

In some examples of the third aspect, the method further comprises receiving, at the relay node from the source node, a communication request message for establishing a connection to the target node, by modifying an existing connection between the relay node and the target node; and sending, from the relay node to the source node, a communication reject message indicating a rejection to establish connection between source node and relay node due to rejection to modify the existing connection between the relay node and the target node.

In some examples of the third aspect, the communication reject message indicating the rejection to modify the connection comprises identification information indicating the source node and/or identification information indicating the target node.

In some examples of the third aspect, the method further comprises deriving, based on the identification information indicating the source node, the source node among a plurality of source nodes with which the target node is connected causing the rejection.

In some examples of the third aspect, the communication request message for modifying the connection comprises a PROSE DIRECT LINK MODIFICATION REQUEST message and/or wherein the communication reject message indicating the rejection to modify connection comprises a PROSE DIRECT LINK MODIFICATION REJECT message.

In some examples of the third aspect, the communication reject message comprises one or more cause values indicating that the rejection is due to rejection by the target node.

In some examples of the third aspect, the one or more cause values are included in an existing information element for signaling cause values of the relay node in the communication reject message.

In some examples of the third aspect, the communication reject message comprises an additional information element for signaling cause values of the target node.

In some examples of the third aspect, the communication request message for establishing connection comprises a PROSE DIRECT LINK ESTABLISHMENT REQUEST message and/or wherein the communication reject message indicating the rejection to establish connection comprises a PROSE DIRECT LINK ESTABLISHMENT REJECT message.

In some examples of the third aspect, the communication reject message indicates a rejection by one or more second relay nodes via which the source node is to connect to the target node.

In some examples of the third aspect, the communication reject message comprises one or more cause values indicating that the rejection is due to rejection by a second relay node among the one or more second relay nodes.

In some examples of the third aspect, the one or more cause values are included in an existing information element for signaling cause values of the relay node in the communication reject message.

In some examples of the third aspect, the communication reject message comprises an additional information element for signaling cause values of the second relay node.

In some examples of the third aspect, the method further comprises, responsive to receiving the rejection by one or more second relay nodes, performing a relay reselection procedure to select another second relay node; and establishing the connection to the target node via the other second relay node.

In some examples of the third aspect, the relay node comprises a user equipment (UE).

According to a fifth aspect of the subject disclosure, a method for relayed connection between nodes is provided. The method comprises receiving, at a relay node from a source node, a communication request message for modifying an existing connection to the relay node to establish a connection to the target node via the relay node; establishing the connection to the target node; and, responsive to receiving a rejection to establish the connection by the target node, sending, from the relay node to the source node, a communication reject message indicating a rejection to modify the existing connection due to rejection to establish the connection by the target node.

In some examples, the method according to the fifth aspect comprises one or more of the examples of the method according to the fourth aspect as outlined above.

According to a sixth aspect of the subject disclosure, a method for relayed connection between nodes is provided. The method comprises receiving, at a relay node from a source node, a communication request message for establishing a connection to the target node via the relay node, by modifying an existing connection between the relay node and the target node; establishing the connection to the target node; and, responsive to receiving a rejection to establish the connection by the target node, sending, from the relay node to the source node, a communication reject message indicating a rejection to establish the connection between source node and relay node due to rejection to modify the existing connection between the relay node and the target node.

In some examples, the method according to the sixth aspect comprises one or more of the examples of the method according to the fourth aspect as outlined above.

According to a seventh aspect of the subject disclosure, a method for relayed connection between nodes is provided. The method comprises receiving, at a first relay node from a second relay node, a communication request message for establishing a connection from a source node to a target node via the first relay node; establishing the connection to the target node; and, responsive to receiving a rejection to establish the connection by the target node, sending, from the first relay node to the second relay node, a communication reject message indicating the rejection to establish the connection by the target node. Optionally, in some examples, the connection to the target node may be established via one or more additional relay nodes.

In some examples, the method according to the seventh aspect comprises one or more of the examples of the method according to the fourth aspect as outlined above.

According to an eighth aspect of the subject disclosure, a method for relayed connection between nodes is provided. The method comprises receiving, at a first relay node from a second relay node, a communication request message for modifying an existing connection to the first relay node to establish a connection from a source node to a target node via the first relay node; establishing the connection to the target node; and, responsive to receiving a rejection to establish the connection by the target node, sending, from the second relay node to the first relay node, a communication reject message indicating a rejection to modify the existing connection due to rejection to establish the connection by the target node. Optionally, in some examples, the connection to the target node may be established via one or more additional relay nodes.

In some examples, the method according to the eighth aspect comprises one or more of the examples of the method according to the fourth aspect as outlined above.

According to a ninth aspect of the subject disclosure, a method for relayed connection between nodes is provided. The method comprises receiving, at a first relay node from a second relay node, a communication request message for establishing a connection from a source node to a target node via the first relay node, by modifying an existing connection between the first relay node and the target node; modifying the existing connection to the target node; and, responsive to receiving a rejection to modify the existing connection by the target node, sending, from the first relay node to the second relay node, a communication reject message indicating a rejection to establish the connection from the source node to the target node due to rejection to modify the existing connection between the first relay node and the target node. Optionally, in some examples, the (existing) connection to the target node may be established via one or more additional relay nodes.

In some examples, the method according to the ninth aspect comprises one or more of the examples of the method according to the fourth aspect as outlined above.

According to a tenth aspect of the subject disclosure, a source node (e.g., a source user device or user equipment (UE)) or an apparatus in such a source node is provided. The source node or apparatus according to the tenth aspect comprises at least one processor and at least one memory including computer program code. The computer program code causes the source node or apparatus, when executed with the at least one processor, to send, to a relay node, a communication request message for establishing connection to a target node via the relay node; and receive, from the relay node, a communication reject message indicating a rejection to establish connection by the target node.

In some examples of the tenth aspect, the computer program code further causes the apparatus or source node, when executed with the at least one processor, to, responsive to receiving the communication reject message, retry to establish the connection to the target node by sending, to the relay node, another communication request message for establishing connection to the target node via the relay node.

In some examples of the tenth aspect, the computer program code further causes the apparatus or source node, when executed with the at least one processor, to, responsive to receiving the communication reject message, start a timer; and send the other communication request message responsive to lapse of the timer.

In some examples of the tenth aspect, the computer program code further causes the apparatus or source node, when executed with the at least one processor, to, responsive to receiving the communication reject message, perform a relay reselection procedure to select another relay node; and send, to the other relay node, a communication request message for establishing connection to the target node via the other relay node.

In some examples of the tenth aspect, the computer program code further causes the apparatus or source node, when executed with the at least one processor, to, responsive to receiving the communication reject message, determine whether the rejection by the target node is permanent; and responsive to determining that the rejection is permanent, perform a discovery procedure to discover another target with which to establish connection via the relay node or another relay node.

In some examples of the tenth aspect, the computer program code further causes the apparatus or source node, when executed with the at least one processor, to send, to the relay node, a communication request message for modifying an existing connection to the relay node to establish connection to the target node; and receive, from the relay node, a communication reject message indicating a rejection to modify the existing connection due to rejection to establish the connection by the target node.

In some examples of the tenth aspect, the computer program code further causes the apparatus or source node, when executed with the at least one processor, to send, to the relay node, a communication request message for establishing a connection to the target node, by modifying an existing connection between the relay node and the target node; and receive, from relay node, a communication reject message indicating a rejection to establish the connection between source node and relay node due to rejection to modify the existing connection between the relay node and the target node.

In some examples of the tenth aspect, the communication reject message indicating the rejection to modify the connection comprises identification information indicating the source node and/or identification information indicating the target node.

In some examples of the tenth aspect, the computer program code further causes the apparatus or source node, when executed with the at least one processor, to derive, based on the identification information indicating the target node, the target node among a plurality of target nodes with which the source node is trying to connect causing the rejection.

In some examples of the tenth aspect, the communication request message for modifying the connection comprises a PROSE DIRECT LINK MODIFICATION REQUEST message and/or wherein the communication reject message indicating the rejection to modify connection comprises a PROSE DIRECT LINK MODIFICATION REJECT message.

In some examples of the tenth aspect, the communication reject message comprises one or more cause values indicating that the rejection is due to rejection by the target node.

In some examples of the tenth aspect, the one or more cause values are included in an existing information element for signaling cause values of the relay node in the communication reject message.

In some examples of the tenth aspect, the communication reject message comprises an additional information element for signaling cause values of the target node.

In some examples of the tenth aspect, the communication request message for establishing connection comprises a PROSE DIRECT LINK ESTABLISHMENT REQUEST message and/or wherein the communication reject message indicating the rejection to establish connection comprises a PROSE DIRECT LINK ESTABLISHMENT REJECT message.

In some examples of the tenth aspect, the communication reject message indicates a rejection by one or more second relay nodes via which the source node is to connect to the target node.

In some examples of the tenth aspect, the communication reject message comprises one or more cause values indicating that the rejection is due to rejection by a second relay node among the one or more second relay nodes.

In some examples of the tenth aspect, the one or more cause values are included in an existing information element for signaling cause values of the relay node in the communication reject message.

In some examples of the tenth aspect, the communication reject message comprises an additional information element for signaling cause values of the second relay node.

According to an eleventh aspect of the subject disclosure, a source node (e.g., a source user device or user equipment (UE)) or an apparatus in such a source node is provided. The source node or apparatus according to the eleventh aspect comprises at least one processor and at least one memory including computer program code. The computer program code causes the source node or apparatus, when executed with the at least one processor, to send, to a relay node, a communication request message for modifying an existing connection to the relay node to establish connection to the target node via the relay node; and receive, from the relay node, a communication reject message indicating a rejection to modify the existing connection due to rejection to establish the connection by the target node.

In some examples, the computer program code causes the source node or apparatus according to the eleventh aspect, when executed with the at least one processor, to perform one or more of the examples of the method according to the first aspect as outlined above.

According to a twelfth aspect of the subject disclosure, a source node (e.g., a source user device or user equipment (UE)) or an apparatus in such a source node is provided. The source node or apparatus according to the twelfth aspect comprises at least one processor and at least one memory including computer program code. The computer program code causes the source node or apparatus, when executed with the at least one processor, to send, to a relay node, a communication request message for establishing a connection to a target node via the relay node, by modifying an existing connection between the relay node and the target node; and receive, from relay node, a communication reject message indicating a rejection to establish the connection between source node and relay node due to rejection to modify the existing connection between the relay node and the target node.

In some examples, the computer program code causes the source node or apparatus according to the twelfth aspect, when executed with the at least one processor, to perform one or more of the examples of the method according to the first aspect as outlined above.

According to a thirteenth aspect of the subject disclosure, a relay node (e.g., a relay user device or user equipment (UE)) or an apparatus in such a relay node is provided. The relay node or apparatus according to the thirteenth aspect comprises at least one processor and at least one memory including computer program code. The computer program code causes the relay node or apparatus, when executed with the at least one processor, to receive, from a source node, a communication request message for establishing connection to a target node via the relay node; establish the connection to the target node; and responsive to receiving a rejection to establish the connection by the target node, send, to the source node, a communication reject message indicating the rejection to establish connection by the target node.

In some examples of the thirteenth aspect, the computer program code further causes the apparatus or relay node, when executed with the at least one processor, to receive, from the source node, a communication request message for modifying an existing connection to the relay node to establish connection to the target node; and responsive to receiving a rejection to establish the connection by the target node, send, to the source node, a communication reject message indicating a rejection to modify the existing connection due to rejection to establish the connection by the target node.

In some examples of the thirteenth aspect, the computer program code further causes the apparatus or relay node, when executed with the at least one processor, to receive, from the source node, a communication request message for establishing a connection to the target node, by modifying an existing connection between the relay node and the target node; and send, to the source node, a communication reject message indicating a rejection to establish the connection between source node and relay node due to rejection to modify the existing connection between the relay node and the target node.

In some examples of the thirteenth aspect, the communication reject message indicating the rejection to modify the connection comprises identification information indicating the source node and/or identification information indicating the target node.

In some examples of the thirteenth aspect, the computer program code further causes the apparatus or relay node, when executed with the at least one processor, to derive, based on the identification information indicating the source node, the source node among a plurality of source nodes with which the target node is connected causing the rejection.

In some examples of the thirteenth aspect, the communication request message for modifying the connection comprises a PROSE DIRECT LINK MODIFICATION REQUEST message and/or wherein the communication reject message indicating the rejection to modify connection comprises a PROSE DIRECT LINK MODIFICATION REJECT message.

In some examples of the thirteenth aspect, the communication reject message comprises one or more cause values indicating that the rejection is due to rejection by the target node.

In some examples of the thirteenth aspect, the one or more cause values are included in an existing information element for signaling cause values of the relay node in the communication reject message.

In some examples of the thirteenth aspect, the communication reject message comprises an additional information element for signaling cause values of the target node.

In some examples of the thirteenth aspect, the communication request message for establishing connection comprises a PROSE DIRECT LINK ESTABLISHMENT REQUEST message and/or wherein the communication reject message indicating the rejection to establish connection comprises a PROSE DIRECT LINK ESTABLISHMENT REJECT message.

In some examples of the thirteenth aspect, the communication reject message indicates a rejection by one or more second relay nodes via which the source node is to connect to the target node.

In some examples of the thirteenth aspect, the communication reject message comprises one or more cause values indicating that the rejection is due to rejection by a second relay node among the one or more second relay nodes.

In some examples of the thirteenth aspect, the one or more cause values are included in an existing information element for signaling cause values of the relay node in the communication reject message.

In some examples of the thirteenth aspect, the communication reject message comprises an additional information element for signaling cause values of the second relay node.

In some examples of the thirteenth aspect, the computer program code further causes the apparatus or relay node, when executed with the at least one processor, to, responsive to receiving the rejection by one or more second relay nodes, perform a relay reselection procedure to select another second relay node; and establish the connection to the target node via the other second relay node.

According to a fourteenth aspect of the subject disclosure, a relay node (e.g., a relay user device or user equipment (UE)) or an apparatus in such a relay node is provided. The relay node or apparatus according to the fourteenth aspect comprises at least one processor and at least one memory including computer program code. The computer program code causes the relay node or apparatus, when executed with the at least one processor, to receive, from another relay node, a communication request message for establishing a connection from a source node to a target node via the relay node; establishing the connection to the target node; and, responsive to receiving a rejection to establish the connection by the target node, sending, to the other relay node, a communication reject message indicating the rejection to establish the connection by the target node. Optionally, in some examples, the connection to the target node may be established via one or more additional relay nodes.

In some examples, the computer program code causes the relay node or apparatus according to the fourteenth aspect, when executed with the at least one processor, to perform one or more of the examples of the method according to the fourth aspect as outlined above.

According to a fifteenth aspect of the subject disclosure, a relay node (e.g., a relay user device or user equipment (UE)) or an apparatus in such a relay node is provided. The relay node or apparatus according to the fifteenth aspect comprises at least one processor and at least one memory including computer program code. The computer program code causes the relay node or apparatus, when executed with the at least one processor, to receive, from another relay node, a communication request message for modifying an existing connection to the relay node to establish a connection from a source node to a target node via the relay node; establish the connection to the target node; and, responsive to receiving a rejection to establish the connection by the target node, send, to the other relay node, a communication reject message indicating a rejection to modify the existing connection due to rejection to establish the connection by the target node. Optionally, in some examples, the connection to the target node may be established via one or more additional relay nodes.

In some examples, the computer program code causes the relay node or apparatus according to the fifteenth aspect, when executed with the at least one processor, to perform one or more of the examples of the method according to the fourth aspect as outlined above.

According to a sixteenth aspect of the subject disclosure, a relay node (e.g., a relay user device or user equipment (UE)) or an apparatus in such a relay node is provided. The relay node or apparatus according to the sixteenth aspect comprises at least one processor and at least one memory including computer program code. The computer program code causes the relay node or apparatus, when executed with the at least one processor, to receive, from another relay node, a communication request message for establishing a connection from a source node to a target node via the relay node, by modifying an existing connection between the relay node and the target node; modify the existing connection to the target node; and, responsive to receiving a rejection to modify the existing connection by the target node, send, to the other relay node, a communication reject message indicating a rejection to establish the connection from the source node to the target node due to rejection to modify the existing connection between the relay node and the target node. Optionally, in some examples, the (existing) connection to the target node may be established via one or more additional relay nodes.

In some examples, the computer program code causes the relay node or apparatus according to the sixteenth aspect, when executed with the at least one processor, to perform one or more of the examples of the method according to the fourth aspect as outlined above.

According to a seventeenth aspect of the subject disclosure, a source node (e.g., a source user device or user equipment (UE)) or an apparatus in such a source node is provided. The source node or apparatus according to the seventeenth aspect comprises means for sending, to a relay node, a communication request message for establishing connection to a target node via the relay node (a sending module); and means for receiving, from the relay node, a communication reject message indicating a rejection to establish connection by the target node (a receiving module).

In some examples of the seventeenth aspect, the source node or apparatus further comprises means or modules for performing one or more of the examples according to the first aspect.

According to an eighteenth aspect of the subject disclosure, a source node (e.g., a source user device or user equipment (UE)) or an apparatus in such a source node is provided. The source node or apparatus according to the eighteenth aspect comprises means for sending, to a relay node, a communication request message for modifying an existing connection to the relay node to establish connection to the target node via the relay node (a sending module); and means for receiving, from the relay node, a communication reject message indicating a rejection to modify the existing connection due to rejection to establish the connection by the target node (a receiving module).

In some examples of the eighteenth aspect, the source node or apparatus further comprises means or modules for performing one or more of the examples according to the first aspect.

According to a nineteenth aspect of the subject disclosure, a source node (e.g., a source user device or user equipment (UE)) or an apparatus in such a source node is provided. The source node or apparatus according to the nineteenth aspect comprises means for sending, to a relay node, a communication request message for establishing a connection to a target node via the relay node, by modifying an existing connection between the relay node and the target node (a sending module); and means for receiving, from relay node, a communication reject message indicating a rejection to establish the connection between source node and relay node due to rejection to modify the existing connection between the relay node and the target node (a receiving module).

In some examples of the nineteenth aspect, the source node or apparatus further comprises means or modules for performing one or more of the examples according to the first aspect.

According to a twentieth aspect of the subject disclosure, a relay node (e.g., a relay user device or user equipment (UE)) or an apparatus in such a relay node is provided. The relay node or apparatus according to the twentieth aspect comprises means for receiving, from a source node, a communication request message for establishing connection to a target node via the relay node (a receiving module); means for establishing the connection to the target node (an establishing module); and means for sending, to the source node, a communication reject message indicating the rejection to establish connection by the target node responsive to receiving a rejection to establish the connection by the target node (a sending module).

In some examples of the twentieth aspect, the relay node or apparatus further comprises means or modules for performing one or more of the examples according to the fourth aspect.

According to a twenty-first aspect of the subject disclosure, a relay node (e.g., a relay user device or user equipment (UE)) or an apparatus in such a relay node is provided. The relay node or apparatus according to the twenty-first aspect comprises means for receiving, from another relay node, a communication request message for establishing a connection from a source node to a target node via the relay node (a receiving module); means for establishing the connection to the target node (an establishing module); and means for sending, to the other relay node, a communication reject message indicating the rejection to establish the connection by the target node responsive to receiving a rejection to establish the connection by the target node (a sending module).

In some examples of the twenty-first aspect, the relay node or apparatus further comprises means or modules for performing one or more of the examples according to the fourth aspect.

According to a twenty-second aspect of the subject disclosure, a relay node (e.g., a relay user device or user equipment (UE)) or an apparatus in such a relay node is provided. The relay node or apparatus according to the twenty-second aspect comprises means for receiving, from another relay node, a communication request message for modifying an existing connection to the relay node to establish a connection from a source node to a target node via the relay node; establish the connection to the target node (a receiving module); and means for sending, to the other relay node, a communication reject message indicating a rejection to modify the existing connection due to rejection to establish the connection by the target node responsive to receiving a rejection to establish the connection by the target node (a sending module).

In some examples of the twenty-second aspect, the relay node or apparatus further comprises means or modules for performing one or more of the examples according to the fourth aspect.

According to a twenty-third aspect of the subject disclosure, a relay node (e.g., a relay user device or user equipment (UE)) or an apparatus in such a relay node is provided. The relay node or apparatus according to the twenty-third aspect comprises means for receiving, from another relay node, a communication request message for establishing a connection from a source node to a target node via the relay node, by modifying an existing connection between the relay node and the target node (a receiving module); means for modifying the existing connection to the target node (a modifying module); and means for sending, to the other relay node, a communication reject message indicating a rejection to establish the connection from the source node to the target node due to rejection to modify the existing connection between the relay node and the target node responsive to receiving a rejection to modify the existing connection by the target node (a sending module).

In some examples of the twenty-third aspect, the relay node or apparatus further comprises means or modules for performing one or more of the examples according to the fourth aspect.

According to a twenty-fourth aspect of the subject disclosure, a computer program product comprises program instructions stored on a computer readable medium to execute steps according to any one of the examples of the methods according to the first to ninth aspect as outlined above when said program is executed on a computer.

According to a twenty-fifth aspect of the subject disclosure, a non-transitory computer-readable medium containing computer-executable instructions which when run on one or more processors perform the steps according to any one of the examples of the methods according to the first to ninth aspect as outline above.

The above-noted aspects and features may be implemented in systems, apparatuses, methods, articles and/or non-transitory computer-readable media depending on the desired configuration. The subject disclosure may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings, and claims.

BRIEF DESCRIPTION OF THE DRAWINGS

A better understanding of the subject disclosure can be obtained when the following detailed description of various embodiments is considered in conjunction with the following drawings, in which.

DETAILED DESCRIPTION

Figure 1:
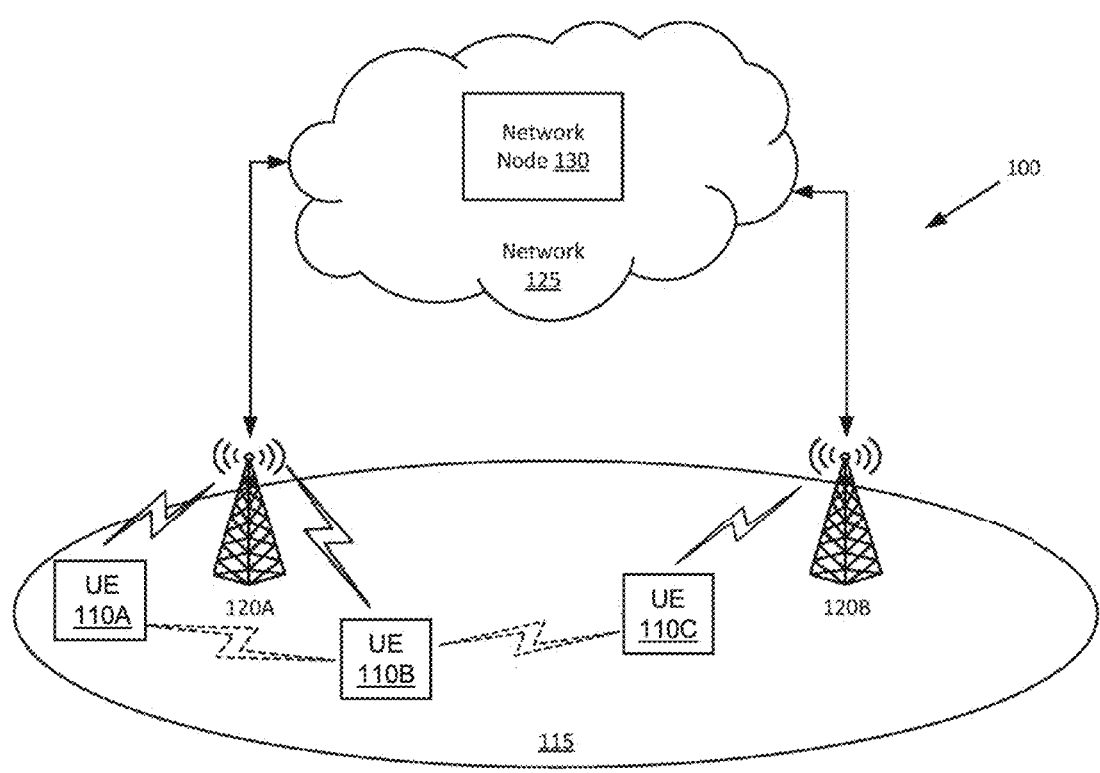
FIG. 1 shows a schematic diagram of an example wireless network.

The examples and embodiments set forth below represent information to enable those skilled in the art to practice the subject disclosure. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, "plurality" means two or more, while "a" means one or more. As used herein, a "set" of items may include one or more of such items. As used herein, whether in the subject disclosure or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims or the subject disclosure to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements. As used herein, "and/or" and "at least one of" means that the listed items are alternatives, but the alternatives also include any combination of the listed items.

Before explaining the examples according to the subject disclosure in detail, certain general principles of a wireless communication system are briefly explained with reference to FIGS. 1 to 3 to assist in understanding the technology underlying the described examples.

FIG. 1 illustrates an example of a wireless network 100 that may be used for wireless communications. Wireless network 100 includes wireless devices, such as UEs 110 (e.g., 110A, 110B, 110C), and network nodes, such as radio access nodes 120 (e.g., 120A, 120B) (e.g., eNBs, gNBs, etc.), connected to one or more network nodes 130 via an interconnecting network 125. The network 100 may use any suitable deployment scenarios. UEs 110 within coverage area 115 may each be capable of communicating directly with radio access nodes 120 over a wireless interface. In some embodiments, UEs 110 may also be capable of communicating with each other via D2D communication. For example, the UE 110A may communicate with the UE 110C via the UE 110B. In this scenario, UE 110B is acting as relay such that the communication between the UE 110A and UE 110C is an indirect (relayed) communication.

Also, UE 110A may communicate with radio access node 120A over a wireless interface. That is, UE 110A may transmit wireless signals to and/or receive wireless signals from radio access node 120A. The wireless signals may contain voice traffic, data traffic, control signals, and/or any other suitable information.

As used herein, the term "user equipment" (UE) has the full breadth of its ordinary meaning and may refer to any type of wireless device which can communicate with a network node and/or with another UE in a cellular or mobile or wireless communication system. Examples of UE are target device, D2D UE, machine type UE or UE capable of machine-to-machine (M2M) communication, personal digital assistant, tablet, mobile terminal, smart phone, laptop embedded equipped (LEE), laptop mounted equipment (LME), USB dongles, ProSe UE, vehicle-to-vehicle (V2V) UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 2.

In some embodiments, an area of wireless signal coverage 115 associated with a radio access node 120 may be referred to as a cell. However, particularly with respect to 5G concepts, beams may be used instead of cells and, as such, it is important to note that the concepts described herein are equally applicable to both cells and beams.

The interconnecting network 125 may refer to any interconnecting system capable of transmitting audio, video, signals, data, messages, etc., or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network such as a Public Land Mobile Network (PLMN), 4G and 5G networks, an enterprise intranet, or any other suitable communication link, including combinations thereof.

In some embodiments, the network node 130 may be a core network node, managing the establishment of communication sessions and other various other functionalities for UEs 110. UEs 110 may exchange certain signals with the network node 130 using the non-access stratum (NAS) layer. In non-access stratum signaling, signals between UEs 110 and the network node 130 may be transparently passed through the radio access network.

As used herein, the term "network node" has the full breadth of its ordinary meaning and may correspond to any type of radio access node (or radio network node) or any network node, which can communicate with a UE and/or with another network node in a cellular or mobile or wireless communication system. Examples of network nodes are NodeB, MeNB, SeNB, a network node may belonging to MCG or SCG, base station (BS), multi-standard radio (MSR) radio access node such as MSR BS, eNodeB, network controller, radio network controller (RNC), base station controller (BSC), relay, base transceiver station (BTS), access point (AP), transmission point, transmission node, core network node (e.g., MSC, MME, etc.), etc. Example embodiments of a network node are described in more detail below with respect to FIG. 3.

In some embodiments, radio access node 120 may be a distributed radio access node. The components of the radio access node 120, and their associated functions, may be separated into two main units (or sub-radio network nodes) which may be referred to as the central unit (CU) and the distributed unit (DU). Different distributed radio network node architectures are possible. For instance, in some architectures, a DU may be connected to a CU via dedicated wired or wireless link (e.g., an optical fiber cable) while in other architectures, a DU may be connected a CU via a transport network. Also, how the various functions of the radio access node 120 are separated between the CU(s) and DU(s) may vary depending on the chosen architecture.

Exemplary wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology (RAT). The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other RAT examples comprise those provided by base stations of systems that are based on technologies such as WLAN and/or Worldwide Interoperability for Microwave Access (WiMax). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-A. Base stations of NR systems may be known as next generation Node Bs (gNBs). Changes to the network architecture may depend on the need to support various radio technologies and finer Quality of Service (QoS) support, and some on-demand requirements for QoS levels to support Quality of Experience (QoE) of user point of view. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes, or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UEs exchanging traffic with the data network (DN). The UPF is controlled by an SMF (Session Management Function) that receives policies from a PCF (Policy Control Function). The CN may also include an AMF (Access & Mobility Function).

Figure 2:
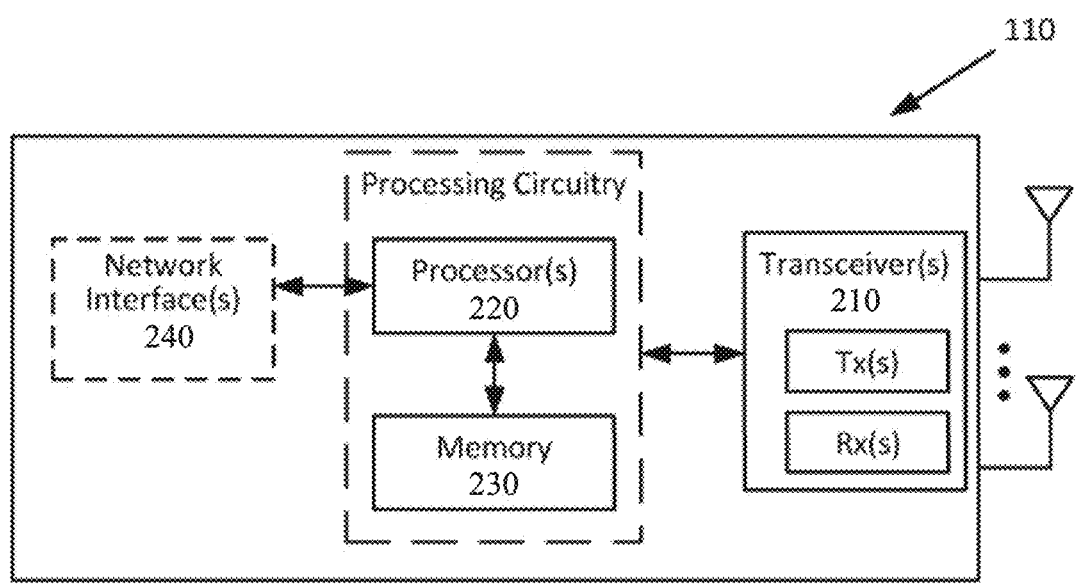
FIG. 2 shows a schematic diagram of an example wireless device.

FIG. 2 is a schematic diagram of an example wireless device, UE 110, in accordance with certain embodiments. UE 110 includes a transceiver 210, processor 220, memory 230, and a network interface 240. In some embodiments, the transceiver 210 facilitates transmitting wireless signals to and receiving wireless signals from radio access node 120 (e.g., via transmitter(s) (Tx), receiver(s) (Rx) and antenna(s)). The processor 220 executes instructions to provide some or all of the functionalities described herein as being provided by UE 110, and the memory 230 stores the instructions executed by the processor 220. In some embodiments, the processor 220 and the memory 230 form processing circuitry.

The processor 220 may include any suitable combination of hardware to execute instructions and manipulate data to perform some or all of the described functions of a wireless device, such as the functions of UE 110 described herein. In some embodiments, the processor 220 may include, for example, one or more computers, one or more central processing units (CPUs), one or more microprocessors, one or more application specific integrated circuits (ASICs), one or more field programmable gate arrays (FPGAs) and/or other logic.

The memory 230 is generally operable to store instructions, such as a computer program, software, an application including one or more of logic, rules, algorithms, code, tables, etc. and/or other instructions capable of being executed by a processor 220. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 220 of UE 110. For example, the memory 230 includes computer program code causing the processor 220 to perform processing according to the methods described below with reference to FIGS. 4 to 15.

The network interface 240 is communicatively coupled to the processor 220 and may refer to any suitable device operable to receive input for UE 110, send output from UE 110, perform suitable processing of the input or output or both, communicate to other devices, or any combination thereof. The network interface 240 may include appropriate hardware (e.g., port, modem, network interface card, etc.) and software, including protocol conversion and data processing capabilities, to communicate through a network.

Other embodiments of UE 110 may include additional components beyond those shown in FIG. 2 that may be responsible for providing certain aspects of the wireless device's functionalities, including any of the functionalities described herein and/or any additional functionalities (including any functionality necessary to support the mechanisms according to the subject disclosure). As an example, UE 110 may include input devices and circuits, output devices, and one or more synchronization units or circuits, which may be part of the processor 220. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

In some embodiments, the wireless device UE 110 may comprise a series of modules configured to implement the functionalities of the wireless device described herein.

It will be appreciated that the various modules may be implemented as combination of hardware and software, for instance, the processor, memory, and transceiver(s) of UE 110 shown in FIG. 2. Some embodiments may also include additional modules to support additional and/or optional functionalities.

Figure 3:
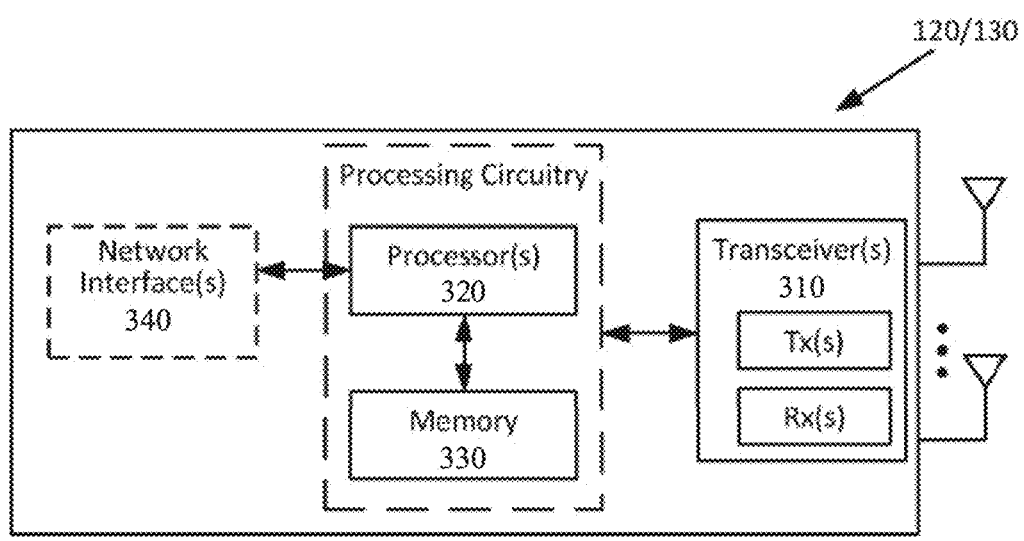
FIG. 3 shows a schematic diagram of an example network node.

FIG. 3 is a schematic diagram of an example radio access node 120 or network node 130. The example radio access node 120 or network node 130 may include one or more of a transceiver 310, processor 320, memory 330, and network interface 340. In some embodiments, the transceiver 310 facilitates transmitting wireless signals to and receiving wireless signals from wireless devices, such as UE 110 (e.g., via transmitter(s) (Tx), receiver(s) (Rx), and antenna(s)). The processor 320 executes instructions to provide some or all of the functionalities described herein as being provided by the radio access node 120 or the network node 130, the memory 330 stores the instructions executed by the processor 320. In some embodiments, the processor 320 and the memory 330 form processing circuitry. The network interface 340 can communicate signals to backend network components, such as a gateway, switch, router, Internet, Public Switched Telephone Network (PSTN), core network nodes or radio network controllers, etc.

The processor 320 can include any suitable combination of hardware to execute instructions and manipulate data to perform some or all of the described functions of the radio access node 120 or the network node 130, such as those described herein. In some embodiments, the processor 320 may include, for example, one or more computers, one or more central processing units (CPUs), one or more microprocessors, one or more application specific integrated circuits (ASICs), one or more field programmable gate arrays (FPGAs) and/or other logic.

The memory 330 is generally operable to store instructions, such as a computer program, software, an application including one or more of logic, rules, algorithms, code, tables, etc. and/or other instructions capable of being executed by a processor 320. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. For example, the memory 330 includes computer program code causing the processor 320 to perform processing according to the methods described below with reference to FIG. 11.

In some embodiments, the network interface 340 is communicatively coupled to the processor 320 and may refer to any suitable device operable to receive input for the radio access node 120 or the network node 130, send output from the radio access node 120 or the network node 130, perform suitable processing of the input or output or both, communicate to other devices, or any combination of the preceding. The network interface 340 may include appropriate hardware (e.g., port, modem, network interface card, etc.) and software, including protocol conversion and data processing capabilities, to communicate through a network.

Other embodiments of the radio access node 120 or the network node 130 can include additional components beyond those shown in FIG. 3 that may be responsible for providing certain aspects of the node's functionalities, including any of the functionalities described herein and/or any additional functionalities (including any functionality necessary to support the solutions described herein). The various different types of radio access nodes or network nodes may include components having the same physical hardware but configured (e.g., via programming) to support different radio access technologies, or may represent partly or entirely different physical components.

Processors, interfaces, and memory similar to those described with respect to FIG. 3 may be included in other nodes (such as UE 110, radio access node 120, etc.). Other nodes may optionally include or not include a wireless interface (such as the transceiver described in FIG. 3).

In some embodiments, the radio access node 120 or the network node 130 may comprise a series of modules configured to implement the functionalities of the radio access node 120 or the network node 130 described herein.

It will be appreciated that the various modules may be implemented as combination of hardware and software, for instance, the processor, memory, and transceiver(s) of the radio access node 120 or the network node 130 shown in FIG. 3. Some embodiments may also include additional modules to support additional and/or optional functionalities.

Before referring to FIGS. 6 to 15 and describing the methods of relayed connection between nodes according to some embodiments of the subject disclosure, some background information and aspects related to the subject disclosure will be provided.

In 3GPP TS 23.304 for Release 18 (version V18.0.0, 2022 December), incorporated herein by reference, Proximity-based Services (ProSe) features in 5GS are specified. These 5G ProSe features comprise, among others, 5G ProSe UE-to-UE Relay which enables indirect communication between two 5G ProSe End UEs (also referred to herein as relayed connection between nodes).

Figure 4:
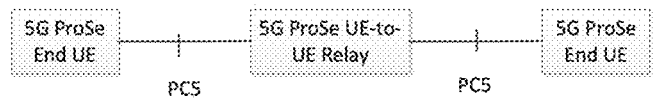
FIG. 4 illustrates an exemplary reference architecture as described in 3GPP TS 23.304 for Release 18.

An exemplary reference architecture as described in 3GPP TS 23.304 for Release 18 is shown in FIG. 4. More specifically, the exemplary reference architecture shows the Layer-2 and Layer-3 5G ProSe UE-to-UE Relay reference architecture.

In FIG. 4, two 5G ProSe End UEs are shown which communicate with each other via a 5G ProSe UE-to-UE Relay. Each 5G ProSe End UE and the 5G ProSe UE-to-UE Relay may have subscriptions from the same Public Land Mobile Network (PLMN) or different PLMNs. 3GPP TS 23.304 for Release 18 specifies the PC5 reference point between UEs supporting 5G ProSe requirements and associated procedures (referred to as ProSe-enabled UEs) such as each 5G ProSe End UE and the 5G ProSe UE-to-UE Relay. The PC5 reference point is used for control and user plane for a procedure employed by a 5G ProSe-enabled UE to discover other 5G ProSe-enabled UEs in its vicinity based on direct radio transmissions between the two UEs with NR technology (referred to as 5G ProSe Direct Discovery), a communication between two or more UEs in proximity that are 5G ProSe-enabled, by means of user plane transmission using NR technology via a path not traversing any network node (referred to as 5G ProSe Direct Communication), a 5G ProSe-enabled UE that provides functionality to support connectivity between 5G ProSe End UEs (referred to as 5G ProSe UE-to-UE Relay) and/or a 5G ProSe-enabled UE that provides functionality to support connectivity to the network for a 5G ProSe-enabled UE that communicates with a Data Network (DN) via a 5G ProSe UE-to-Network Relay (referred to as 5G ProSe UE-to-Network Relay).

3GPP TS 23.304 for Release 18 further specifies that any 5G ProSe-enabled UE may support, among others, procedures for 5G ProSe Direct Communication over PC5 reference point, including Broadcast, Groupcast and Unicast mode 5G ProSe Direct Communication, procedures to act as a 5G ProSe Layer-2 UE-to-UE Relay, procedures to act as a 5G ProSe Layer-3 UE-to-UE Relay, procedures to act as a 5G ProSe Layer-2 End UE, and procedures to act as a 5G ProSe Layer-3 End UE.

Figure 5:
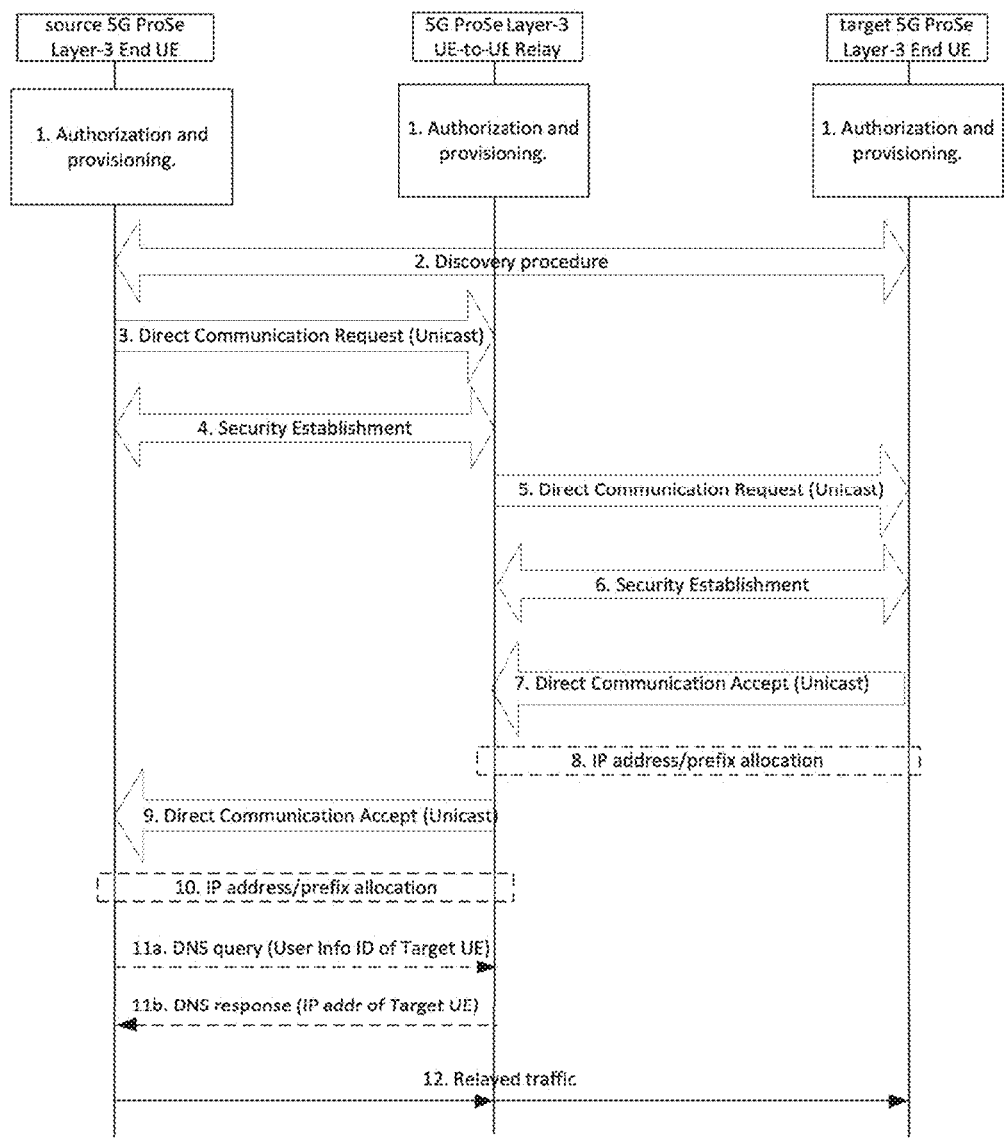
FIG. 5 illustrates an example of a procedure for 5G ProSe Communication via 5G ProSe UE-to-UE Relay as described in 3GPP TS 23.304 for Release 18.

An example of a procedure for 5G ProSe Communication via 5G ProSe UE-to-UE Relay is described in 3GPP TS 23.304 for Release 18 and illustrated in FIG. 5.

As illustrated in FIG. 5, a source 5G ProSe Layer-3 End UE (i.e., a source node) communicates with a target 5G ProSe Layer-3 End UE (i.e., a target node) via a 5G ProSe Layer-3 UE-to-UE Relay (i.e., a relay node). The source 5G ProSe Layer-3 End UE, the target 5G ProSe Layer-3 End UE and the 5G ProSe Layer-3 UE-to-UE Relay may be connected to the same PLMN or different PLMNs.

In step 1, service authorization and provisioning are performed for the source 5G ProSe Layer-3 End UE, the target 5G ProSe Layer-3 End UE and the 5G ProSe Layer-3 UE-to-UE Relay. The procedures for service authorization and provisioning to UE are described in 3GPP TS 23.304 for Release 18.

In step 2, the source 5G ProSe Layer-3 End UE performs discovery of a 5G ProSe Layer-3 UE-to-UE Relay. The procedures for discovery are described in 3GPP TS 23.304 for Release 18.

In step 3, the source 5G ProSe Layer-3 End UE sends a Direct Communication Request message to initiate the unicast Layer-2 link establishment procedure with the 5G ProSe Layer-3 UE-to-UE Relay. The Source Layer-2 ID of the Direct Communication Request message is self-assigned by the source 5G ProSe Layer-3 End UE, and the Destination Layer-2 ID is set to the Source Layer-2 ID of the discovery message of the 5G ProSe Layer-3 UE-to-UE Relay.

In step 4, if the User Info ID of target 5G ProSe Layer-3 End UE and the User Info ID of 5G ProSe Layer-3 UE-to-UE Relay are included in the Direct Communication Request message, the 5G ProSe Layer-3 UE-to-UE Relay responds by establishing the security with the source 5G ProSe Layer-3 End UE. When the security protection is enabled, the source 5G ProSe Layer-3 End UE sends IP Address Configuration, QoS Info to the 5G ProSe Layer-3 UE-to-UE Relay. The Source Layer-2 ID used for the security establishment procedure is self-assigned by the 5G ProSe Layer-3 UE-to-UE Relay, and the Destination Layer-2 ID is set to the Source Layer-2 ID of the received Direct Communication Request message. Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.

In step 5, after the security establishment procedure is completed, the 5G ProSe Layer-3 UE-to-UE Relay sends a Direct Communication Request message to initiate the unicast Layer-2 link establishment procedure with the target 5G ProSe Layer-3 End UE. The Source Layer-2 ID of the Direct Communication Request message is self-assigned by the 5G ProSe Layer-3 UE-to-UE Relay, and the Destination Layer-2 ID is the unicast Layer-2 ID of target 5G ProSe Layer-3 End UE associated with the User Info ID of target 5G ProSe Layer-3 End UE.

In step 6, if the User Info ID of target 5G ProSe Layer-3 End UE is included in the Direct Communication Request message, the target 5G ProSe Layer-3 End UE responds by establishing the security with the 5G ProSe Layer-3 UE-to-UE Relay. When the security protection is enabled, the 5G ProSe Layer-3 UE-to-UE Relay sends IP Address Configuration, QoS Info to the target 5G ProSe Layer-3 End UE. The Source Layer-2 ID used for the security establishment procedure is self-assigned by the target 5G ProSe Layer-3 End UE, and the Destination Layer-2 ID is set to the Source Layer-2 ID of the received Direct Communication Request message. Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.

In step 7, the target 5G ProSe Layer-3 End UE sends a Direct Communication Accept message to the 5G ProSe Layer-3 UE-to-UE Relay that has successfully established security with.

Optionally, for Internet Protocol (IP) traffic, an IP address is allocated for the target 5G ProSe Layer-3 End UE in step 8.

In step 9, after receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with.

Optionally, for IP traffic, an IP address for the source 5G ProSe Layer-3 End UE in step 10 and the 5G ProSe Layer-3 UE-to-UE Relay and the source 5G ProSe Layer-3 End UE exchange Domain Name Service (DNS) messages (steps 11*a* and 11*b*).

In step 12, the source 5G ProSe Layer-3 End UE communicates with the target 5G ProSe Layer-3 End UE via the 5G ProSe Layer-3 UE-to-UE Relay. That is, the source 5G ProSe Layer-3 End UE is performing relayed communication with the target 5G ProSe Layer-3 End UE via the 5G ProSe Layer-3 UE-to-UE Relay.

The signalling messages between the source 5G ProSe Layer-3 End UE and the target 5G ProSe Layer-3 End UE for Direct Communication over PC5 reference point are described in the 5G ProSe direct link establishment procedure of 3GPP TS 24.554 for Release 17 (version V17.3.0, 2022 December), incorporated herein by reference. According to the 5G ProSe direct link establishment procedure the initiating UE (e.g., the source 5G ProSe Layer-3 End UE) sends a PROSE DIRECT LINK ESTABLISHMENT REQUEST message to the target UE (e.g., the 5G ProSe Layer-3 UE-to-UE Relay). The target UE may either accept the direct link establishment request by returning a PROSE DIRECT LINK ESTABLISHMENT ACCEPT message or reject by returning a PROSE DIRECT LINK ESTABLISHMENT REJECT message to the initiating UE. Steps 3 and 9 of FIG. 5 represent the 5G ProSe direct link establishment procedure between the source 5G ProSe Layer-3 End UE as initiating UE and the 5G ProSe Layer-3 UE-to-UE Relay as target UE. Steps 5 and 7 of FIG. 5 represent the 5G ProSe direct link establishment procedure between the 5G ProSe Layer-3 UE-to-UE Relay as target UE and the target 5G ProSe Layer-3 End UE as target UE.

According to 3GPP TS 24.554 for Release 17, the target UE may reject the 5G ProSe direct link establishment request by sending the PROSE DIRECT LINK ESTABLISHMENT REJECT message to the initiating UE. In order to inform the initiating UE about a cause for rejecting the 5G ProSe direct link establishment request, the PROSE DIRECT LINK ESTABLISHMENT REJECT message comprises an information element "PC5 signalling protocol cause" which holds the protocol causes for the rejection as described in 3GPP TS 24.554 for Release 17.

The initiating UE makes use of the "PC5 signalling protocol cause" information to decide if the failure (i.e., the rejection) is permanent or temporary and to take the appropriate next action. Based on the protocol cause for the rejection, the initiating UE decides to retry the connection establishment with the same target UE, or whether the initiating UE needs to perform a relay reselection procedure in order to discover another relay UE.

In some examples, direct communications (i.e., connections) between the source 5G ProSe Layer-3 End UE and the 5G ProSe Layer-3 UE-to-UE Relay and/or between the 5G ProSe Layer-3 UE-to-UE Relay and the target 5G ProSe Layer-3 End UE may already have been established and can be used. In this case, a PROSE DIRECT LINK MODIFICATION REQUEST message may be used to modify the (existing) direct communication, possibly in a modified manner. If the modification of the (existing) direct communication is accepted, a PROSE DIRECT LINK MODIFICATION ACCEPT message may be used, while if the modification is rejected, a PROSE DIRECT LINK MODIFICATION REJECT message may be used. In order to inform the initiating UE about a cause for rejecting the 5G ProSe direct link modification request, the PROSE DIRECT LINK MODIFICATION REJECT message comprises an information element "PC5 signalling protocol cause" which holds the protocol causes for the rejection similar to the PROSE DIRECT LINK ESTABLISHMENT REJECT message.

However, a problem arises if the failure/rejection happened between the 5G ProSe Layer-3 UE-to-UE Relay and the target 5G ProSe Layer-3 End UE because the source 5G ProSe Layer-3 End UE is not informed about a cause for the failure/rejection from the target 5G ProSe Layer-3 End UE. Hence, the source 5G ProSe Layer-3 End UE is not enabled to make use of information about the failure/rejection happened between the 5G ProSe Layer-3 UE-to-UE Relay and the target 5G ProSe Layer-3 End UE and can therefore not take an appropriate next action.

The subject disclosure provides mechanisms of relayed connection between nodes (i.e., the source 5G ProSe End UE and the target 5G ProSe End UE) which contribute to solving the above problem. The subject disclosure addresses the problem and thus enables the source 5G ProSe End UE to make use of information about the failure/rejection happened between the 5G ProSe UE-to-UE Relay and the target 5G ProSe End UE such that the source 5G ProSe End UE can take an appropriate next action in case of failure/rejection.

Now, exemplary methods of relayed connection between nodes according to some embodiments of the subject disclosure will be described.

Figure 6:
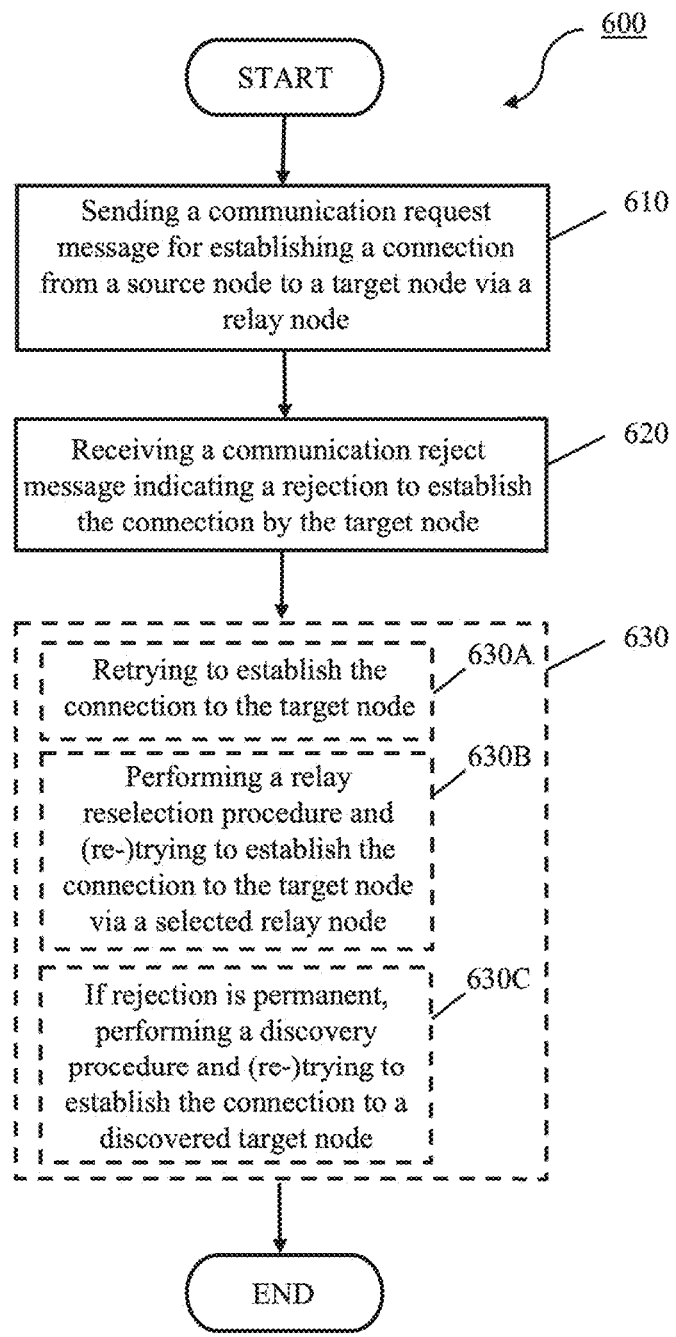
FIG. 6 illustrates a method of relayed connection between nodes according to some embodiments, performed at a source node.

FIG. 6 illustrates a method 600 of relayed connection between nodes according to some embodiments.

The method 600 is performed by a source node such as a user device (e.g., user equipment (UE)), or by an apparatus for use in a source node. The source node comprises a 5G ProSe-enabled UE and represents a source 5G ProSe End UE as described above. In some examples, the source node may be represented by any one of the wireless devices, such as UE 110A of the wireless network 100 as described above with reference to FIG. 1, or the wireless device 110 as described above with reference to FIG. 2.

The relay node may be a user device (e.g., user equipment (UE)), or an apparatus for use in a relay node. The relay node comprises a 5G ProSe-enabled UE and represents a 5G ProSe UE-to-UE Relay as described above. In some examples, the relay node may be represented by any one of the wireless devices, such as UE 110B of the wireless network 100 as described above with reference to FIG. 1, or the wireless device 110 as described above with reference to FIG. 2.

The target node may also be a user device (e.g., user equipment (UE)), or an apparatus for use in a target node. The target node comprises a 5G ProSe-enabled UE and represents a target 5G ProSe End UE as described above. In some examples, the target node may be represented by any one of the wireless devices, such as UE 110C of the wireless network 100 as described above with reference to FIG. 1, or the wireless device 110 as described above with reference to FIG. 2.

The source node, the relay node and the target node are connected to, and served by, the network 100. More specifically, the source node, the relay node and the target node are located in an area (i.e., a cell 115) served by the base station (e.g., gNBs 120A, 120B) and use services provided or supported by the network 100. For example, the network 100 may support Proximity-based Services (ProSe) enabling 5G ProSe Communication via 5G ProSe UE-to-UE Relay (i.e., indirect/relayed communication via a relay). As described above, the source node, the relay node and the target node may be connected to the same PLMN, or different PLMNs.

The method 600 starts at block 610. At block 610, the source node sends, to the relay node, a communication request message for establishing a connection to the target node via the relay node. With the communication request message, the source node requests to establish a first direct connection between the source node and the relay node (also referred to as first hop) and a second direct connection between the relay node and the target node (also referred to as second hop), thereby establishing an indirect connection from the source node to the target node via the relay node.

In some examples, the communication request message for establishing the connection comprises a PROSE DIRECT LINK ESTABLISHMENT REQUEST message.

Additionally, the source node may start a timer (e.g., T5080) in response to sending the communication request message to the relay node. The timer indicates a time period within which the source node is to receive a reply (accept or reject) to the communication request message from the target node. If the timer lapses without receiving the reply, the source node may re-send the communication request message to the relay node if the connection to the target node is still to be established.

At block 620, the source node receives, from the relay node, a communication reject message indicating a rejection to establish the connection by the target node. With the communication reject message, the relay node indicates to, and thus informs, the source node that the target node rejected establishing the second direct connection. In other words, establishing the second direct connection resulted in a failure or rejection such that the second hop was not established. Due to said failure or rejection, the connection to the target node as requested by the source node was not established.

In some examples, the communication reject message indicating the rejection to establish the connection comprises a PROSE DIRECT LINK ESTABLISHMENT REJECT message.

In some examples, the communication reject message comprises a cause value (i.e., one or more cause values) to indicate the rejection by the target node. For example, the PROSE DIRECT LINK ESTABLISHMENT REJECT message may comprise a PC5 failure cause indicating to the source node that the establishment of the connection was rejected, and thus failed, due to a connection rejection from the target node, rather than a rejection from the relay node. As will be described in more detailed hereinbelow, a new PC5 failure cause may be used to indicate to the source 5G ProSe End UE that the "failure is due to a connection rejection from the target 5G ProSe End UE, rather than a rejection from the 5G ProSe UE-to-UE Relay itself".

In some examples, the cause value to indicate the rejection by the target node may be included in an existing information element (IE) for signaling cause values of the relay node in the communication reject message. For example, the PROSE DIRECT LINK ESTABLISHMENT REJECT message comprises an IE (e.g., PC5 signalling protocol cause IE) to indicate cause values from the relay node to the source node. Said IE may be used to indicate the rejection by the target node and thus extended to indicate the cause value of the target node as well. As will be described hereinbelow, the new PC5 failure cause may be provided in the existing PC5 signalling protocol cause IE used for signaling rejection causes of the 5G ProSe UE-to-UE Relay.

Additionally, or alternatively, the communication reject message may, in some examples, comprise an additional IE for signaling cause values of the target node. The additional IE is used to indicate the rejection by the target node and provide additional details (i.e., cause values) indicating to the source node a reason why establishing the connection was rejected by the target node. The additional IE may be optional and is included in the communication reject message if the existing IE indicates the rejection by the target node. That is, in some examples, the existing IE for signaling cause values of the relay node in the communication reject message indicates to the source node that the failure is due to a connection rejection from the target node, while the additional IE provides the cause value indicating the reason for the connection rejection by the target node. As will be described hereinbelow, an additional PC5 end UE failure cause IE may be included in the PROSE DIRECT LINK ESTABLISHMENT REJECT message. The PC5 end UE failure cause IE carries the rejection causes that are provided by the target node (i.e., the target 5G ProSe End UE itself) and is included when the new PC5 failure cause is provided by the PC5 signalling protocol cause IE. In generating the PROSE DIRECT LINK ESTABLISHMENT REJECT message, the relay node (i.e., the 5G ProSe UE-to-UE Relay) includes the additional PC5 end UE failure cause IE and sets the rejection cause value (i.e., one or more rejection cause values) provided by the target node (i.e., the target 5G ProSe End UE). Based on the PC5 signalling protocol cause IE and the rejection cause value in the PC5 end UE failure cause IE, the source node (i.e., the source 5G ProSe End UE) is informed about why the target node (i.e., the target 5G ProSe End UE) has rejected to establish the connection (i.e., the PC5 connection between the relay node and the target node).

In some examples, the existing information element (IE) for signaling cause values of the relay node in the communication reject message may also be extended to signal the rejection cause values of the target node. That is, the existing PC5 signalling protocol cause IE in the PROSE DIRECT LINK ESTABLISHMENT REJECT message may be extended by adding a plurality of additional cause values that represent failure situations from the target node (i.e., the target 5G ProSe End UE).

Additionally, in some examples, the source node may stop the timer (e.g., T5080) in response to receiving the communication reject message from the relay node. Prior to stopping the timer, the source node may check whether the communication reject message was received prior to lapse of the timer.

In some examples, if the source node receives the communication reject message indicating the rejection to establish the connection by the target node (block 620), the source node may perform procedure for handling or coping with the rejection by the target node (block 630). Examples of said procedures include a retry procedure for retrying to establish the connection, a relay reselection procedure for selecting another relay node via which to establish the connection, and a discovery procedure for discovering another target node to which to establish the connection.

In some examples, if the source node receives the communication reject message indicating the rejection to establish the connection by the target node (block 620), the source node may retry to establish the connection to the target node by sending another communication request message for establishing the connection to the target node via the relay node (block 630A). The procedure for sending the other communication request message corresponds to sending the communication request message of block 610. Preferably, the source node may start performing the retry after lapse of a timer. For example, in response to receiving the communication reject message (block 620), the source node may start a timer. When the timer lapses, and if the connection to the target node is still to be established, the source node sends the other communication request message as retry to establish the connection to the target node via the relay node.

In some examples, if the source node receives the communication reject message indicating the rejection to establish the connection by the target node (block 620), the source node may perform a relay reselection procedure to select another relay node and send a new communication request message for establishing the connection to the target node via the other relay node (block 630B). The procedure for sending the new communication request message corresponds to sending the communication request message of block 610 but the communication request message is sent to the other relay node selected by the relay reselection procedure and not to the relay node. In order to decide whether to perform the relay reselection procedure, the source node may consider the reason why establishing the connection was rejected by the target node (e.g., one or more cause values) as provided in the communication reject message.

In some examples, if the source node receives the communication reject message indicating the rejection to establish the connection by the target node (block 620), the source node may also determine whether the rejection by the target node is permanent (block 630C). The determination may be based on the reason why establishing the connection was rejected by the target node (e.g., one or more cause values) as provided in the communication reject message. If the source node determines that the rejection is permanent, the source node may perform a discovery procedure to discover another target node with which to establish connection via the relay node or another relay node. In response to discovering the other target node, the source node sends, to the relay node or the other relay, a new communication request message for establishing the connection to the other target node via the relay node or via the other relay. The procedure for sending the new communication request message corresponds to sending the communication request message of block 610 but the communication request message is sent towards the other target node.

With the method 600, the source node is informed that the rejection is due to a rejection to establish the connection between the relay node and the target node (i.e., the second hop) caused by the target node.

Figure 7:
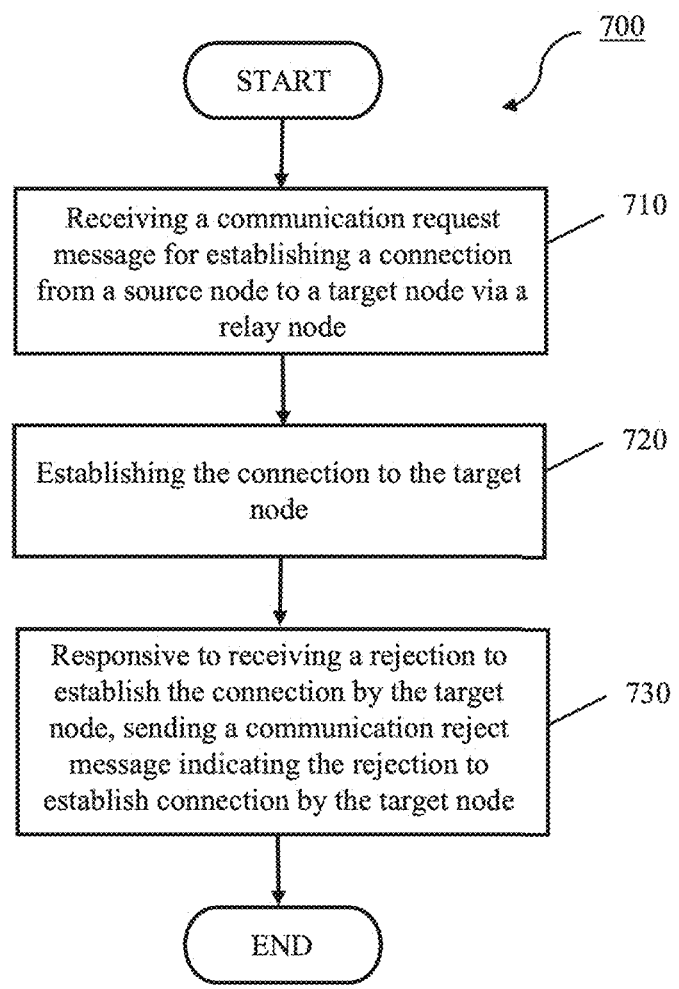
FIG. 7 illustrates a method of relayed connection between nodes according to some embodiments, performed at a relay node.

FIG. 7 illustrates a method 700 of relayed connection between nodes according to some embodiments.

The method 700 is performed by the relay node such as a user device (e.g., user equipment (UE)), or by an apparatus for use in a relay node. The relay node comprises a 5G ProSe-enabled UE and represents a 5G ProSe UE-to-UE Relay as described above. In some examples, the relay node may be represented by any one of the wireless devices, such as UE 110B of the wireless network 100 as described above with reference to FIG. 1, or the wireless device 110 as described above with reference to FIG. 2.

The source node may be a user device (e.g., user equipment (UE)), or an apparatus for use in a source node. The source node comprises a 5G ProSe-enabled UE and represents a source 5G ProSe End UE as described above. In some examples, the source node may be represented by any one of the wireless devices, such as UE 110A of the wireless network 100 as described above with reference to FIG. 1, or the wireless device 110 as described above with reference to FIG. 2.

The target node may also be a user device (e.g., user equipment (UE)), or an apparatus for use in a target node. The target node comprises a 5G ProSe-enabled UE and represents a target 5G ProSe End UE as described above. In some examples, the target node may be represented by any one of the wireless devices, such as UE 110C of the wireless network 100 as described above with reference to FIG. 1, or the wireless device 110 as described above with reference to FIG. 2.

As described above, the source node, the relay node and the target node are connected to, and served by, the network 100, and may be connected to the same PLMN, or different PLMNs.

The method 700 starts at block 710. At block 710, the relay node receives, from the source node, a communication request message for establishing a connection to the target node via the relay node. With the communication request message, the source node requests to establish a first direct connection between the source node and the relay node (i.e., the first hop) and a second direct connection between the relay node and the target node (i.e., the second hop), thereby establishing an indirect connection from the source node to the target node via the relay node.

In some examples, the communication request message for establishing the connection comprises a PROSE DIRECT LINK ESTABLISHMENT REQUEST message.

At block 720, the relay node tries to establish the connection to the target node (i.e., the second hop). More specifically, the relay node initiates a procedure for establishing the connection to the target node. For example, the relay node may send a communication request message for establishing a connection to the target node (e.g., the PROSE DIRECT LINK ESTABLISHMENT REQUEST message)

and receives, from the target node, a communication accept message (e.g., the PROSE DIRECT LINK ESTABLISHMENT ACCEPT message), thereby establishing the connection between the relay node and the target node, or a communication reject message (e.g., the PROSE DIRECT LINK ESTABLISHMENT REJECT message) indicating a rejection to establish the connection by the target node.

If the relay node receives the communication reject message (i.e., the rejection to establish the connection by the target node), the relay node sends, to the source node which requested to establish the communication to the target node via the relay node, a communication reject message indicating the rejection to establish the connection by the target node (block 730). With the communication reject message, the relay node indicates to, and thus informs, the source node that the target node rejected establishing the second direct connection. In other words, establishing the second direct connection resulted in a failure or rejection such that the second hop was not established. As a result, due to said failure or rejection, the connection to the target node as requested by the source node was not established.

Details regarding the indication of the rejection to establish the connection by the target node in the communication reject message sent by the relay node to the source node are described above in conjunction with the method 600. Repetition of said details are therefore omitted here.

Figure 8:
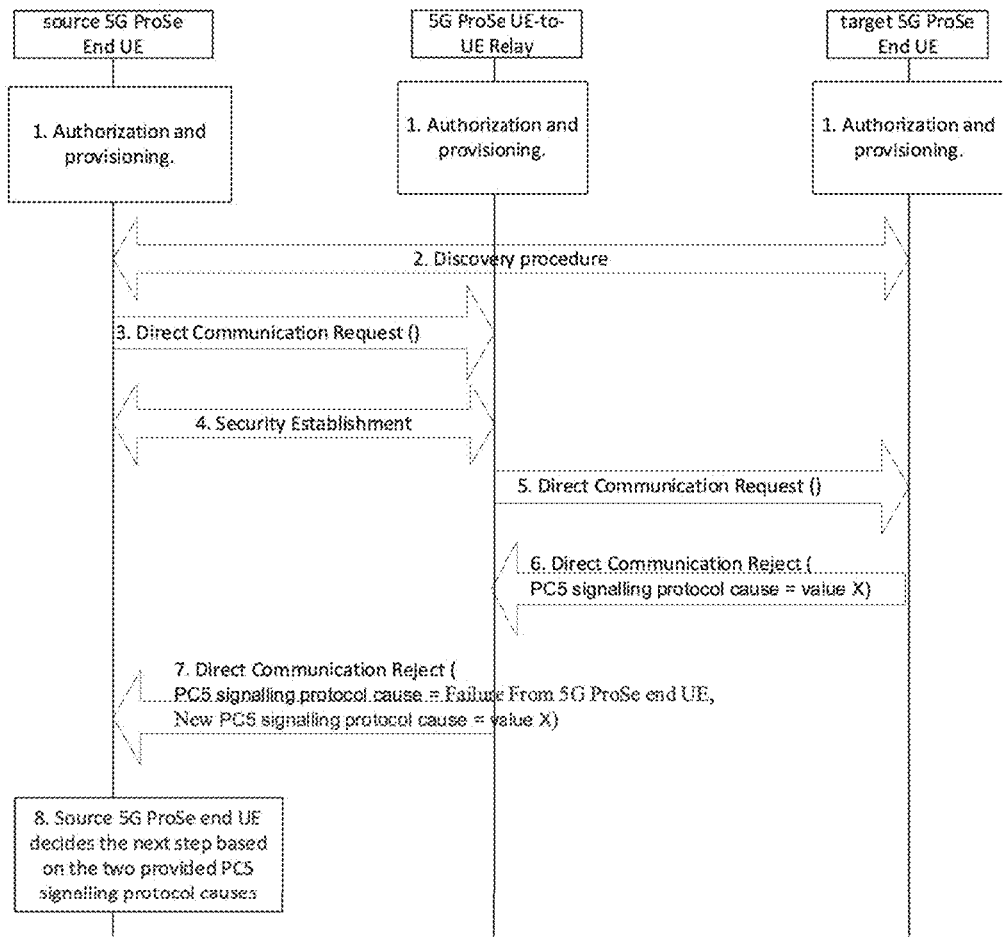
FIG. 8 illustrates an exemplary message sequence diagram corresponding to a method of relayed connection between nodes according to some embodiments of the subject disclosure, as shown in FIGS. 6 and 7.

FIG. 8 illustrates an exemplary message sequence diagram corresponding to the methods of relayed connection between nodes according to some embodiments of the subject disclosure, as described above with reference to FIGS. 6 and 7. More specifically, the exemplary message sequence diagram of FIG. 8 concerns a 5G ProSe Communication via 5G ProSe UE-to-UE Relay using Direct Link Establishment procedure in case of failure/rejection by the target nodes (e.g., the target 5G ProSe End UE).

Steps 1, 2 and 4 illustrated in FIG. 8 correspond to steps 1, 2 and 4 of FIG. 5. Detailed explanations are therefore omitted here to avoid repetition.

In step 3, the source 5G ProSe End UE sends a Direct Communication Request message to initiate the link establishment procedure with the 5G ProSe UE-to-UE Relay. Step 3 corresponds to sending the communication request message for establishing the connection to the target node via the relay node (i.e., block 610 of FIG. 6 and block 710 of FIG. 7).

For example, the Direct Communication Request message may comprise the PROSE DIRECT LINK ESTABLISHMENT REQUEST message.

In response to receiving the Direct Communication Request message, the 5G ProSe UE-to-UE Relay sends a Direct Communication Request message to initiate the link establishment procedure with the target 5G ProSe End UE (step 5). With the Direct Communication Request message sent in step 5, the relay node tries to establish the connection to the target node (i.e., block 720 of FIG. 7).

For example, the Direct Communication Request message may comprise the PROSE DIRECT LINK ESTABLISHMENT REQUEST message.

The link establishment procedure may fail due to a failure at or rejection by the 5G ProSe End UE and the target 5G ProSe End UE sends a Direct Communication Reject message to the 5G ProSe UE-to-UE Relay. The Direct Communication Reject message comprises an indication of the rejection by the target 5G ProSe End UE.

For example, the Direct Communication Reject message (e.g., the PROSE DIRECT LINK ESTABLISHMENT REJECT message) may include an information element such as the PC5 signalling protocol cause IE used for signalling cause values. The PC5 signalling protocol cause IE may comprise a cause value (i.e., one or more cause values) indicating the rejection cause of the target 5G ProSe End UE (e.g., value X shown in FIG. 8).

In response to receiving the Direct Communication Reject message from the target 5G ProSe End UE, the 5G ProSe UE-to-UE Relay sends a Direct Communication Reject message to the source 5G ProSe End UE (step 7). Step 7 corresponds to sending the communication reject message indicating the rejection to establish the connection by the target node (i.e., block 620 of FIG. 6 and block 730 of FIG. 7). The Direct Communication Reject message comprises an indication of the rejection by the target 5G ProSe End UE.

For example, the Direct Communication Reject message may comprise the PROSE DIRECT LINK ESTABLISHMENT REJECT message indicating a failure from the target 5G ProSe End UE. More specifically, the Direct Communication Reject message (e.g., the PROSE DIRECT LINK ESTABLISHMENT REJECT message) may include an information element such as the (existing) PC5 signalling protocol cause IE for signalling cause values of the 5G ProSe UE-to-UE Relay. The (existing) PC5 signalling protocol cause IE may be extended to provide the indication of the rejection by the target 5G ProSe End UE to the source 5G ProSe End UE. For example, the (existing) PC5 signalling protocol cause IE may indicate that the rejection is due to a failure or rejection from the target 5G ProSe End UE. In addition, the Direct Communication Reject message (e.g., the PROSE DIRECT LINK ESTABLISHMENT REJECT message) may further include a new PC5 signalling protocol cause IE (also referred to as PC5 end UE failure cause IE) for signalling cause values of the target 5G ProSe End UE. The new PC5 signalling protocol cause IE may be optional and included if the (existing) PC5 signalling protocol cause IE indicates the rejection by the target 5G ProSe End UE. The new PC5 signalling protocol cause IE may comprise one or more cause values for indicating the rejection cause of the target 5G ProSe End UE (e.g., value X shown in FIG. 8), similar to the cause value indicating a rejection cause of the 5G ProSe UE-to-UE Relay.

In response to receiving the Direct Communication Reject message from the 5G ProSe UE-to-UE Relay, the source 5G ProSe End UE may decide next steps (step 8) based on the indication of the rejection by the target 5G ProSe End UE (e.g., one or more cause values provided in the existing PC5 signalling protocol cause IE and the new PC5 signalling protocol cause IE). The next steps in step 8 may comprise the procedures corresponding to block 630 of FIG. 6.

Figure 9:
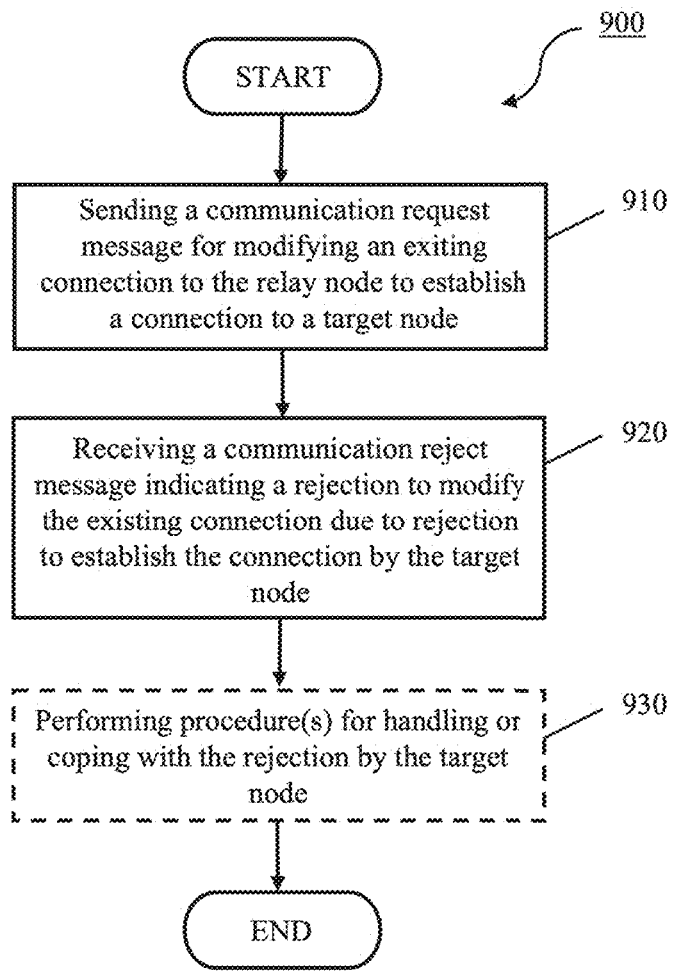
FIG. 9 illustrates a method of relayed connection between nodes according to some embodiments, performed at a source node.

FIG. 9 illustrates a method 900 of relayed connection between nodes according to some embodiments.

The method 900 is performed by a source node such as a user device (e.g., user equipment (UE)), or by an apparatus for use in a source node (e.g., a source 5G ProSe End UE) as described above. The relay node and target node may each be a user device (e.g., user equipment (UE)), or an apparatus for use therein (e.g., a 5G ProSe UE-to-UE Relay and a target 5G ProSe End UE, respectively) as described above.

In the method 900, the source node has an established connection to the relay node (i.e., an existing connection at the first hop). For example, the existing connection to the relay node may have been established as result of performing the methods 600 and 700 as described above.

At block 910, the source node sends, to the relay node, a communication request message for modifying the existing connection between the source node and the relay node to establish a connection to the target node. With the communication request message, the source node requests to modify the existing direct connection between the source node and the relay node (i.e., the first hop) and establish a direct connection between the relay node and the target node (i.e., the second hop), thereby establishing the (indirect) connection from the source node to the target node via the relay node.

In some examples, the communication request message for modifying the existing connection comprises a PROSE DIRECT LINK MODIFICATION REQUEST message.

At block 920, the source node receives, from the relay node, a communication reject message indicating a rejection to modify the existing connection due to rejection to establish the connection by the target node. With the communication reject message, the relay node indicates to, and thus informs, the source node that the target node rejected establishing the direct connection between the relay node and the target node. In other words, establishing the direct connection resulted in a failure or rejection such that the second hop was not established.

In some examples, the communication reject message indicating the rejection to establish the connection comprises a PROSE DIRECT LINK MODIFICATION REJECT message.

The indication of the rejection to modify the existing connection due to rejection to establish the connection by the target node corresponds to the indication of the rejection to establish connection by the target node as described above in conjunction with FIG. 6. Repetition of details are therefore omitted here.

In some examples, if the source node receives the communication reject message indicating the rejection to modify the existing connection due to rejection to establish the connection by the target node (block 920), the source node may perform procedure(s) for handling or coping with the rejection by the target node (block 930). Examples of such procedures are described above in conjunction with block 630 of FIG. 6.

With the method 900 described above, the source node is informed that the rejection is due to a rejection to establish the connection between the relay node and the target node (i.e., the second hop) caused by the target node.

In some examples, the source device may try to connect, or may be connected, to a plurality of target nodes. In such examples, the communication reject message indicating the rejection to modify the connection may comprise identification information indicating the target node of the plurality of target nodes which caused the rejection. Based on the identification information, the source node may derive the target node causing the rejection. That is, the source node may derive an identity of the target node. In some examples, the communication reject message may comprise a target end UE info to indicate the user info ID of the target node (i.e., the 5G ProSe End UE) when the rejection happens in the first hop due to the rejection to establish the connection on the second hop. This allows to guide the source node to know which target node is rejecting to establish the connection when the source node is trying to establish connections with multiple target nodes.

Figure 10:
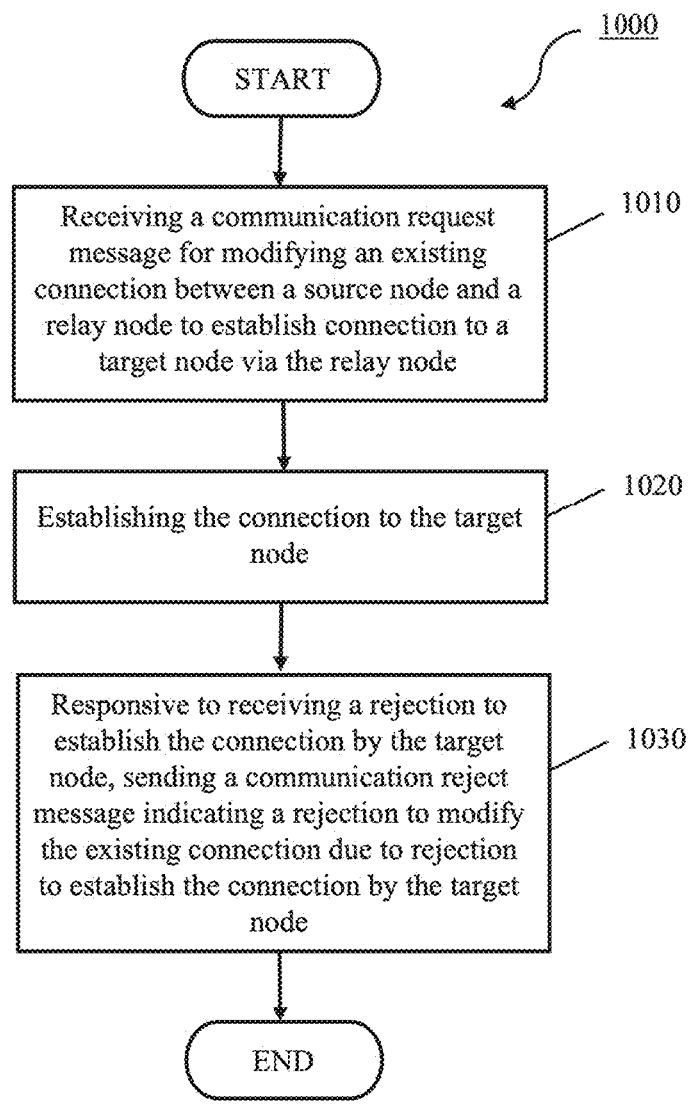
FIG. 10 illustrates a method of relayed connection between nodes according to some embodiments, performed at a relay node.

FIG. 10 illustrates a method 1000 of relayed connection between nodes according to some embodiments.

The method 1000 is performed by a relay node such as a user device (e.g., user equipment (UE)), or by an apparatus for use in a relay node (e.g., a 5G ProSe UE-to-UE Relay) as described above. The source node and the target node may each be a user device (e.g., user equipment (UE)), or an apparatus for use therein (e.g., a source 5G ProSe End UE and a target 5G ProSe End UE, respectively) as described above.

In the method 1000, the source node has an established connection to the relay node (i.e., an existing connection at the first hop). For example, the existing connection to the relay node may have been established as result of performing the methods 600 and 700 as described above.

At block 1010, the relay node receives, from the source node, a communication request message for modifying the existing connection between the source node and the relay node to establish a connection to the target node. With the communication request message, the source node requests to modify the existing direct connection between the source node and the relay node (i.e., the first hop) and establish a direct connection between the relay node and the target node (i.e., second hop), thereby establishing the (indirect) connection from the source node to the target node via the relay node.

In some examples, the communication request message for modifying the existing connection comprises a PROSE DIRECT LINK MODIFICATION REQUEST message.

At block 1020, the relay node establishes or tries to establish the connection to the target node (i.e., the second hop). More specifically, the relay node performs a procedure to establish the connection to the target node. For example, the relay node may send a communication request message for establishing the (direct) connection to the target node (e.g., a PROSE DIRECT LINK ESTABLISHMENT REQUEST message) and receives, from the target node, a communication accept message (e.g., a PROSE DIRECT LINK ESTABLISHMENT ACCEPT message), thereby establishing the connection between the relay node and the target node, or a communication reject message (e.g., a PROSE DIRECT LINK ESTABLISHMENT REJECT message) indicating a rejection to establish the connection by the target node.

If the relay node received the communication reject message (i.e., the rejection to establish the connection by the target node), the relay node sends, to the source node which requested to establish the communication to the target node via the relay node, a communication reject message indicating a rejection to modify the existing connection due to rejection to establish the connection by the target node (block 1030). With the communication reject message, the relay node indicates to, and thus informs, the source node that the target node rejected establishing the second direct connection. In other words, establishing the second direct connection resulted in a failure or rejection such that the second hop was not established.

In some examples, the communication reject message indicating the rejection to establish the connection comprises a PROSE DIRECT LINK MODIFICATION REJECT message.

Details regarding the indication of the rejection in the communication reject message sent by the relay node to the source node are described above in conjunction with the method 600 of FIG. 6. Repetition of said details are therefore omitted here.

Figure 11:
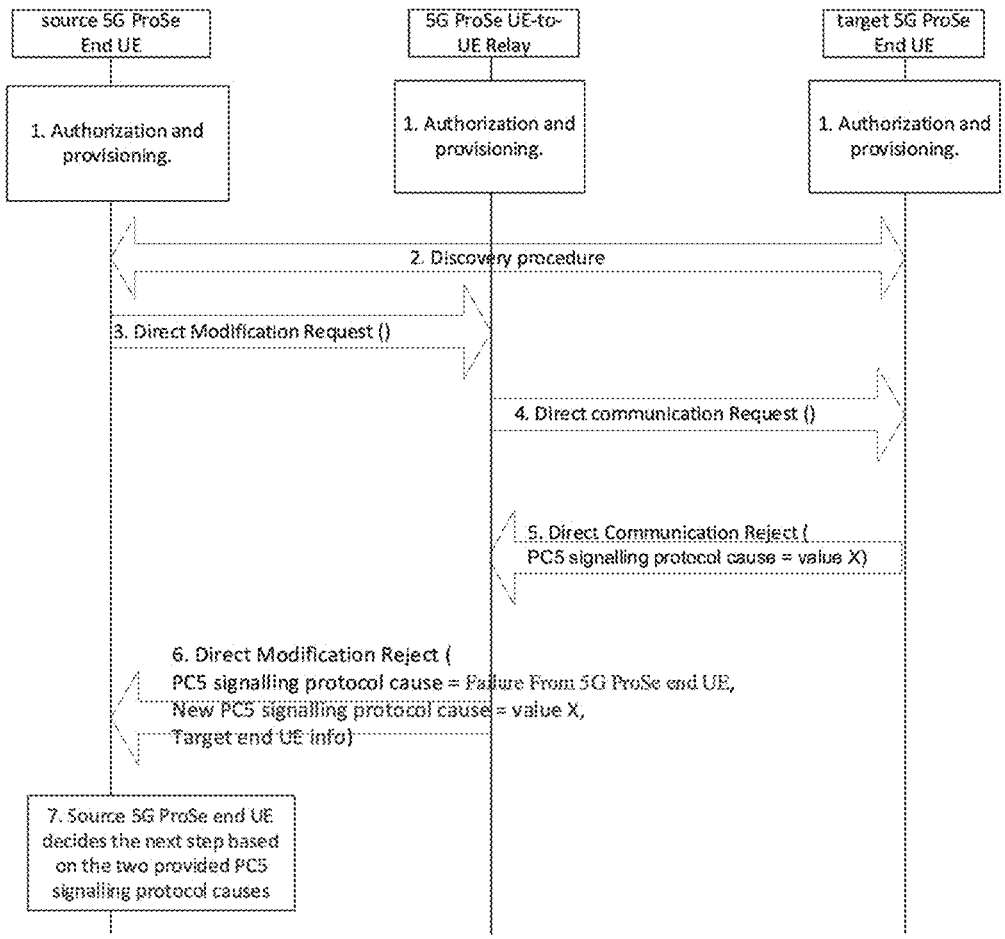
FIG. 11 illustrates an exemplary message sequence diagram corresponding to a method of relayed connection between nodes according to some embodiments of the subject disclosure, as shown in FIGS. 9 and 10.

FIG. 11 illustrates an exemplary message sequence diagram corresponding to a method of relayed connection between nodes according to some embodiments of the subject disclosure, as described above with reference to FIGS. 9 and 10. More specifically, the exemplary message sequence diagram of FIG. 11 concerns 5G ProSe Communication via 5G ProSe UE-to-UE Relay using Direct Link Modification procedure on first hop in case of failure/rejection by the target node (e.g., the target 5G ProSe End UE).

The source 5G ProSe End UE and the 5G ProSe UE-to-UE Relay have an (existing) connection resulting e.g. from performing a link establishment procedure as described above.

Steps 1 and 2 illustrated in FIG. 11 correspond to steps 1 and 2 of FIG. 5. Detailed explanations are therefore omitted here to avoid repetition.

In step 3, the source 5G ProSe End UE sends a Direct Modification Request message to initiate the link modification procedure with the 5G ProSe UE-to-UE Relay. That is, the source 5G ProSe End UE sends the Direct Modification Request message to modify the existing connection. Step 3 corresponds to sending the communication request message for modifying an existing connection to the relay node to establish a connection to the target node (i.e., block 910 of FIG. 9 and block 1010 of FIG. 10).

For example, the Direct Modification Request message may comprise the PROSE DIRECT LINK MODIFICATION REQUEST message.

In response to receiving the Direct Modification Request message, the 5G ProSe UE-to-UE Relay sends a Direct Communication Request message to initiate the link establishment procedure with the target 5G ProSe End UE (step 4). With the Direct Communication Request message, the relay node tries to establish the connection to the target node (i.e., block 1020 of FIG. 10). More specifically, the 5G ProSe UE-to-UE Relay initiates the link establishment procedure to establish the connection with the target 5G ProSe End UE.

For example, the Direct Communication Request message may comprise the PROSE DIRECT LINK ESTABLISHMENT REQUEST message.

The link establishment procedure may fail due to a failure at or rejection by the target 5G ProSe End UE and the target 5G ProSe End UE sends a Direct Communication Reject message to the 5G ProSe UE-to-UE Relay. The Direct Communication Reject message comprises an indication of the rejection by the target 5G ProSe End UE. For example, the Direct Communication Reject message (e.g., the PROSE DIRECT LINK ESTABLISHMENT REJECT message) may include an information element such as the PC5 signalling protocol cause IE used for signalling cause values. The PC5 signalling protocol cause IE may comprise a cause value (i.e., one or more cause values) indicating the rejection cause of the target 5G ProSe End UE (e.g., value X shown in FIG. 11).

In response to receiving the Direct Communication Reject message from the target 5G ProSe End UE, the 5G ProSe UE-to-UE Relay sends a Direct Modification Reject message to the source 5G ProSe End UE (step 6). Step 6 corresponds to sending a communication reject message indicating a rejection to modify the existing connection due to rejection to establish the connection by the target node (i.e., block 920 of FIG. 9 and block 1030 of FIG. 10). The Direct Modification Reject message comprises an indication of the rejection by the target 5G ProSe End UE.

For example, the Direct Modification Reject message may comprise the PROSE DIRECT LINK MODIFICATION REJECT message indicating a failure from the target 5G ProSe End UE. More specifically, the Direct Modification Reject message (e.g., the PROSE DIRECT LINK MODIFICATION REJECT message) may include an information element such as the (existing) PC5 signalling protocol cause IE for signalling cause values of the 5G ProSe UE-to-UE Relay. The (existing) PC5 signalling protocol cause IE may be extended to provide the indication of the rejection by the target 5G ProSe End UE to the source 5G ProSe End UE. For example, the (existing) PC5 signalling protocol cause IE may indicate that the rejection is due to a failure or rejection from the target 5G ProSe End UE. In addition, the Direct Communication Reject message (e.g., the PROSE DIRECT LINK ESTABLISHMENT REJECT message) may further include a new PC5 signalling protocol cause IE (i.e., the PC5 end UE failure cause IE) for signalling cause values of the target 5G ProSe End UE. The new PC5 signalling protocol cause IE may be optional and included if the (existing) PC5 signalling protocol cause IE indicates the rejection by the target 5G ProSe End UE. The new PC5 signalling protocol cause IE may comprise one or more cause values for indicating the rejection cause of the target 5G ProSe End UE (e.g., value X shown in FIG. 11), similar to the cause value indicating a rejection cause of the 5G ProSe UE-to-UE Relay.

As described above, the Direct Modification Reject message may further comprise identification information indicating the target node (i.e., target end UE info shown in step 6) to indicate the user info ID of the target 5G ProSe End UE among a plurality of target 5G ProSe End UEs with which the source 5G ProSe End UE is trying to perform 5G ProSe Communication.

In response to receiving the Direct Modification Reject message from the 5G ProSe UE-to-UE Relay, the source 5G ProSe End UE may decide next steps (step 7) based on the indication of the rejection by the target 5G ProSe End UE (e.g., one or more cause values provided in the existing PC5 signalling protocol cause IE and the new PC5 signalling protocol cause IE). The next steps in step 7 may comprise the procedures corresponding to block 930 of FIG. 9.

Figure 12:
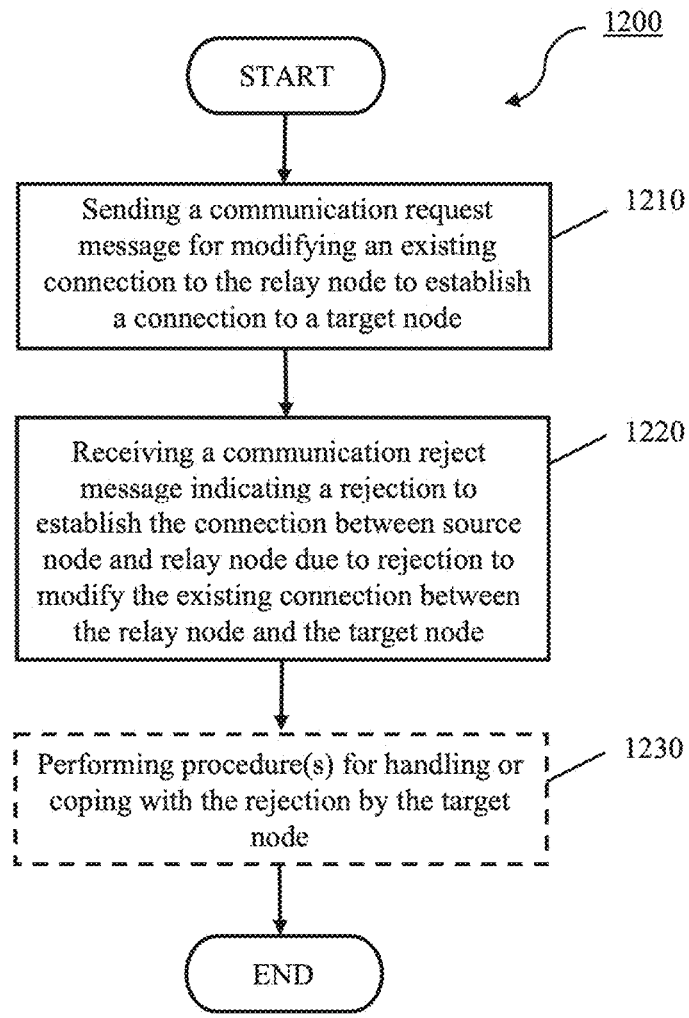
FIG. 12 illustrates a method of relayed connection between nodes according to some embodiments, performed at a source node.

FIG. 12 illustrates a method 1200 of relayed connection between nodes according to some embodiments.

The method 1200 is performed by a source node such as a user device (e.g., user equipment (UE)), or by an apparatus for use in a source node (e.g., a source 5G ProSe End UE) as described above. The relay node and the target node may each be a user device (e.g., user equipment (UE)), or an apparatus for use therein (e.g., a 5G ProSe UE-to-UE Relay and a target 5G ProSe End UE, respectively) as described above.

In the method 1200, the relay node has an established connection to the target node (i.e., an existing connection at the second hop). For example, the existing connection to the relay node may have been established as result of performing the methods 600 and 700 as described above.

At block 1210, the source node sends, to the relay node, a communication request message for establishing a connection to the target node, by modifying the existing connection between the relay node and the target node. With the communication request message, the source node requests to establish a direct connection between the source node and the relay node (i.e., the first hop) and modify the existing direct connection between the relay node and the target node (i.e., the second hop), thereby establishing the (indirect) connection from the source node to the target node via the relay node.

In some examples, the communication request message for establishing the connection comprises a PROSE DIRECT LINK ESTABLISHMENT REQUEST message.

At block 1220, the source node receives, from the relay node, a communication reject message indicating a rejection to establish the connection between source node and relay node due to rejection to modify the existing connection between the relay node and the target node. With the communication reject message, the relay node indicates to, and thus informs, the source node that the target node rejected modifying the existing connection between the relay node and the target node. In other words, modifying the existing connection resulted in a failure or rejection such that the second hop was not modified.

In some examples, the communication reject message indicating the rejection to establish the connection comprises a PROSE DIRECT LINK ESTABLISHMENT REJECT message.

The indication of the rejection to establish the connection between source node and relay node due to rejection to modify the existing connection between the relay node and the target node corresponds to the indication of the rejection to establish connection by the target node as described above in conjunction with FIG. 6. Repetition of details are therefore omitted here.

In some examples, if the source node receives the communication reject message indicating the rejection to establish the connection between source node and relay node due to the rejection to modify the existing connection between the relay node and the target node (block 1220), the source node may perform procedure(s) for handling or coping with the rejection by the target node (block 1230). Examples of such procedures are described above in conjunction with block 630 of FIG. 6.

With the method 1200, the source node is informed that the rejection is due to a rejection to establish the connection between the relay node and the target node (i.e., the second hop) caused by the target node.

Figure 13:
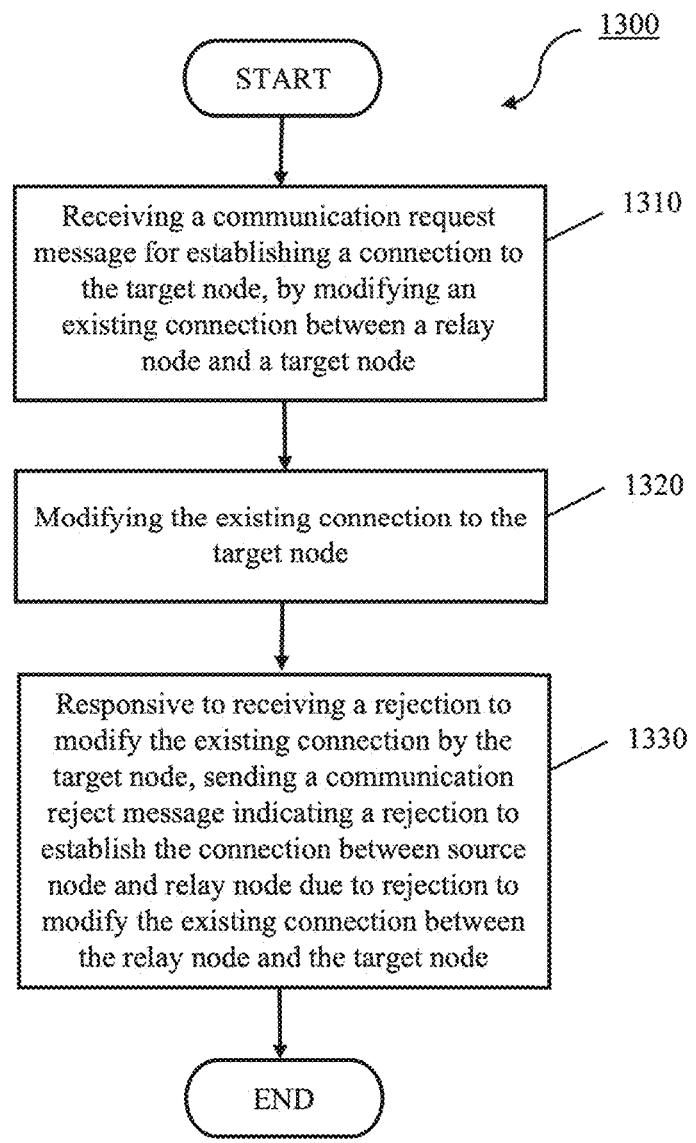
FIG. 13 illustrates a method of relayed connection between nodes according to some embodiments, performed at a relay node.

FIG. 13 illustrates a method 1300 of relayed connection between nodes according to some embodiments.

The method 1300 is performed by a relay node such as a user device (e.g., user equipment (UE)), or by an apparatus for use in a relay node (e.g., a 5G ProSe UE-to-UE Relay) as described above. The source node and the target node may each be a user device (e.g., user equipment (UE)), or an apparatus for use therein (e.g., a source 5G ProSe End UE and a target 5G ProSe End UE, respectively) as described above.

In the method 1200, the relay node has an established connection to the target node (i.e., an existing connection at the second hop). For example, the existing connection to the relay node may have been established as result of performing the methods 600 and 700 as described above.

At block 1310, the relay node receives, from the source node, a communication request message for establishing a connection to the target node, by modifying the existing connection between the relay node and the target node. With the communication request message, the source node requests to establish a direct connection between the source node and the relay node (i.e., the first hop) and modify the existing direct connection between the relay node and the target node (i.e., the second hop), thereby establishing the (indirect) connection from the source node to the target node via the relay node.

In some examples, the communication request message for establishing the connection comprises a PROSE DIRECT LINK ESTABLISHMENT REQUEST message.

At block 1320, the relay node modifies or tries to modify the existing connection to the target node (i.e., the second hop). More specifically, the relay node performs a procedure to modify the existing connection to the target node. For example, the relay node may send a communication request message for modifying the existing connection to the target node (e.g., a PROSE DIRECT LINK MODIFICATION REQUEST message) and receives, from the target node, a communication accept message (e.g., a PROSE DIRECT LINK MODIFICATION ACCEPT message), thereby modifying the existing connection between the relay node and the target node, or a communication reject message (e.g., a PROSE DIRECT LINK MODIFICATION REJECT message) indicating a rejection to modify the existing connection by the target node.

If the relay node received the communication reject message (i.e., the rejection to modify the existing connection by the target node), the relay node sends, to the source node which requested to establish the communication to the target node via the relay node, a communication reject message indicating a rejection to establish the connection between source node and relay node due to rejection to modify the existing connection between the relay node and the target node (block 1330). With the communication reject message, the relay node indicates to, and thus informs, the source node that the target node rejected modifying the existing direct connection. In other words, modifying the existing direct connection resulted in a failure or rejection such that the second hop was not modified.

In some examples, the communication reject message indicating a rejection to establish the connection between source node and relay node due to rejection to modify the existing connection between the relay node and the target node comprises a PROSE DIRECT LINK ESTABLISHMENT REJECT message.

Details regarding the indication of the rejection in the communication reject message are described above in conjunction with FIG. 6. Repetition of details are therefore omitted here.

In some examples, a plurality of source devices may try to connect, or may be connected, to the target node. In such examples, the communication reject message indicating the rejection to establish the connection between the source node and the relay node due to rejection to modify the existing connection between the relay node and the target node comprises identification information indicating the source node among the plurality of source devices which requested to establish the connection to the target node. Based on the identification information, the relay node may derive the source node which is trying to connect to the target node and to which the communication reject message is to be sent. That is, the source node may derive an identity of the target node. In some examples, the communication reject message may comprise a source end UE info to indicate the user info ID of the source node (i.e., the source 5G ProSe End UE) when the rejection of the modification procedure happens in the second hop. This allows to guide the relay node to know which connection (i.e., which source 5G ProSe End UE) on the first hop is rejected when there are a plurality of source nodes trying to establish connections with the same target node.

Figure 14:
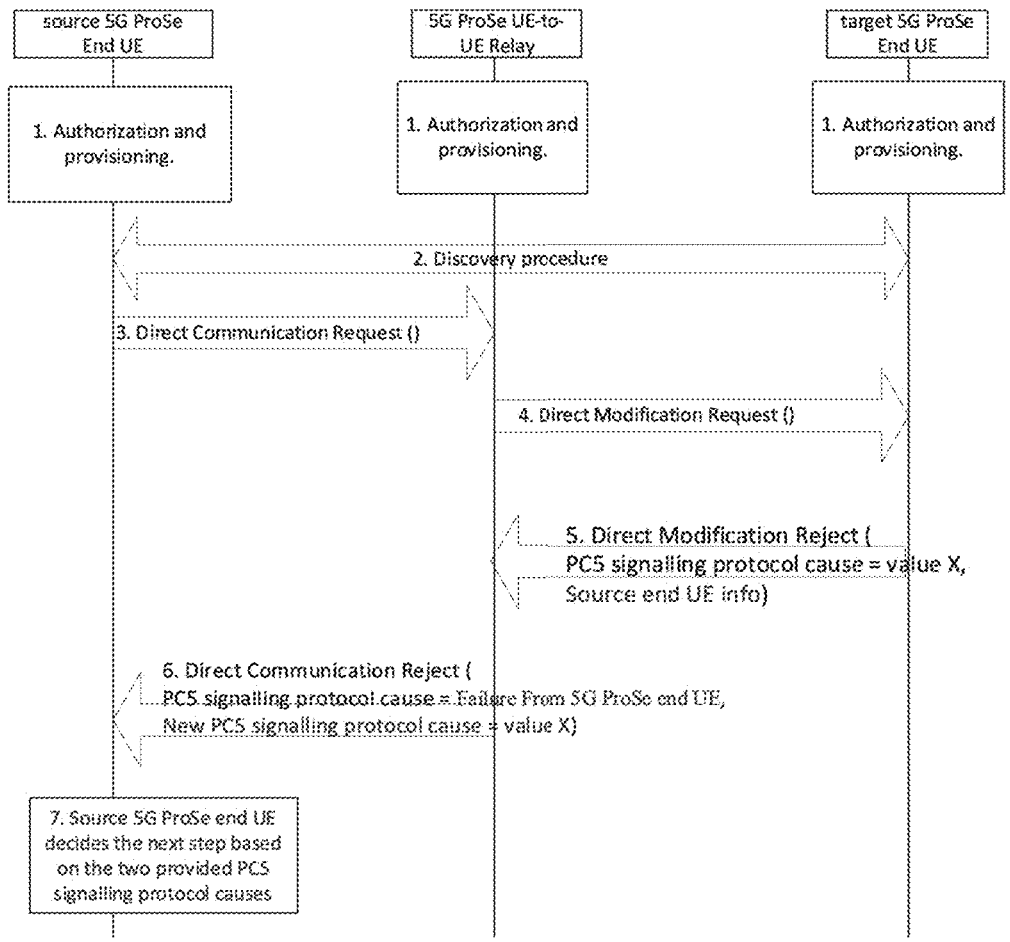
FIG. 14 illustrates an exemplary message sequence diagram corresponding to a method of relayed connection between nodes according to some embodiments of the subject disclosure, as shown in FIGS. 12 and 13.

FIG. 14 illustrates an exemplary message sequence diagram corresponding to a method of relayed connection between nodes according to some embodiments of the subject disclosure, as described above with reference to FIGS. 12 and 13. More specifically, the exemplary message sequence diagram of FIG. 14 concerns 5G ProSe Communication via 5G ProSe UE-to-UE Relay using Direct Link Modification procedure on second hop in case of failure/rejection by the target nodes (e.g., the target 5G ProSe End UE).

The 5G ProSe UE-to-UE Relay and the target 5G ProSe End UE have an (existing) connection resulting e.g. from performing a link establishment procedure as described above.

Steps 1 and 2 illustrated in FIG. 11 correspond to steps 1 and 2 of FIG. 5. Detailed explanations are therefore omitted here to avoid repetition.

In step 3, the source 5G ProSe End UE sends a Direct Communication Request message to initiate the link establishment procedure with the 5G ProSe UE-to-UE Relay. Step 3 corresponds to sending the communication request message for establishing a connection to the relay node (i.e., block 1210 of FIG. 12 and block 1310 of FIG. 13).

For example, the Direct Communication Request message may comprise the PROSE DIRECT LINK ESTABLISHMENT REQUEST message.

In response to receiving the Direct Communication Request message, the 5G ProSe UE-to-UE Relay sends a Direct Modification Request message to initiate the link modification procedure with the target 5G ProSe End UE (step 4). With the Direct Modification Request message, the relay node tries to modify the existing connection to the target node (i.e., block 1320 of FIG. 13).

For example, the Direct Modification Request message may comprise the PROSE DIRECT LINK MODIFICATION REQUEST message.

The link modification procedure may fail due to a failure at or rejection by the target 5G ProSe End UE and the target 5G ProSe End UE sends a Direct Modification Reject message to the 5G ProSe UE-to-UE Relay (step 5). The Direct Modification Reject message comprises an indication of the rejection by the target 5G ProSe End UE. For example, the Direct Modification Reject message (e.g., the PROSE DIRECT LINK MODIFICATION REJECT message) may include an information element such as the PC5 signalling protocol cause IE used for signalling cause values. The PC5 signalling protocol cause IE may comprise a cause value (i.e., one or more cause values) indicating the rejection cause of the target 5G ProSe End UE (e.g., value X shown in FIG. 14).

As described above, the Direct Modification Reject message may further comprise identification information indicating the source node (i.e., source end UE info shown in step 5) to indicate the user info ID of the source 5G ProSe End UE when a plurality of source 5G ProSe End UEs is trying to perform 5G ProSe Communication to the target 5G ProSe End UE.

In response to receiving the Direct Modification Reject message from the target 5G ProSe End UE, the 5G ProSe UE-to-UE Relay sends a Direct Communication Reject message to the source 5G ProSe End UE (step 6). Step 6 corresponds to sending a communication reject message indicating rejection to establish the connection between source node and relay node due to rejection to modify the existing connection between the relay node and the target node (i.e., block 1220 of FIG. 12 and block 1330 of FIG. 13). The Direct Communication Reject message may comprise an indication of the rejection by the target 5G ProSe End UE.

For example, the Direct Communication Reject message may comprise the PROSE DIRECT LINK ESTABLISHMENT REJECT message indicating a failure from the target 5G ProSe End UE. More specifically, the Direct Modification Reject message (e.g., the PROSE DIRECT LINK ESTABLISHMENT REJECT message) may include the (existing) PC5 signalling protocol cause IE for signalling cause values of the 5G ProSe UE-to-UE Relay. The (existing) PC5 signalling protocol cause IE may be extended to provide the indication of the rejection by the target 5G ProSe End UE to the source 5G ProSe End UE. For example, the (existing) PC5 signalling protocol cause IE may indicate that the rejection is due to a failure or rejection from the target 5G ProSe End UE. In addition, the Direct Communication Reject message (e.g., the PROSE DIRECT LINK ESTABLISHMENT REJECT message) may further include a new PC5 signalling protocol cause IE (i.e., the PC5 end UE failure cause IE) for signalling cause values of the target 5G ProSe End UE. The new PC5 signalling protocol cause IE may be optional and is included if the (existing) PC5 signalling protocol cause IE indicates the rejection by the target 5G ProSe End UE. The new PC5 signalling protocol cause IE comprises one or more cause values for indicating the rejection cause of the target 5G ProSe End UE (e.g., value X shown in FIG. 14), similar to the cause value indicating a rejection cause of the 5G ProSe UE-to-UE Relay as described above.

In response to receiving the Direct Communication Reject message from the 5G ProSe UE-to-UE Relay, the source 5G ProSe End UE may decide next steps (step 7) based on the indication of the rejection by the target 5G ProSe End UE (e.g., one or more cause values provided in the existing PC5 signalling protocol cause IE and the new PC5 signalling protocol cause IE). The next steps in step 7 may comprise the procedures corresponding to block 1230 of FIG. 12.

In some exemplary methods of relayed connection between nodes as described above, the connection to the target node may be established via a plurality of relay nodes (i.e., more than one 5G ProSe UE-to-UE Relay) (referred to herein as the multi-hop scenario). For example, the connection to be established comprises a first (direct) connection between the source node and a first relay node (e.g., the relay node as described above), a second (direct) connection between the first relay node and a second relay node, and a third (direct) connection between the second relay node and the target node. To establish the connection between the source node and the target node, the (direct) connection(s) between the nodes may be established if not already existing or modified if (direct) connection(s) already exist. In order to provide indication to the source node which of the (intermediate) relay node rejected establishing/modifying the connection, the communication reject message received at the source node comprises an indication of the (intermediate) relay node causing the rejection to establish the connection to the target node. For example, the (existing) information element in the communication reject message may comprise one or more cause values indicating that the rejection is due to rejection by the (intermediate) relay node. Additionally, or alternatively, the communication reject message may comprise an additional information element for signaling one or more cause values of the (intermediate) relay node.

Figure 15:
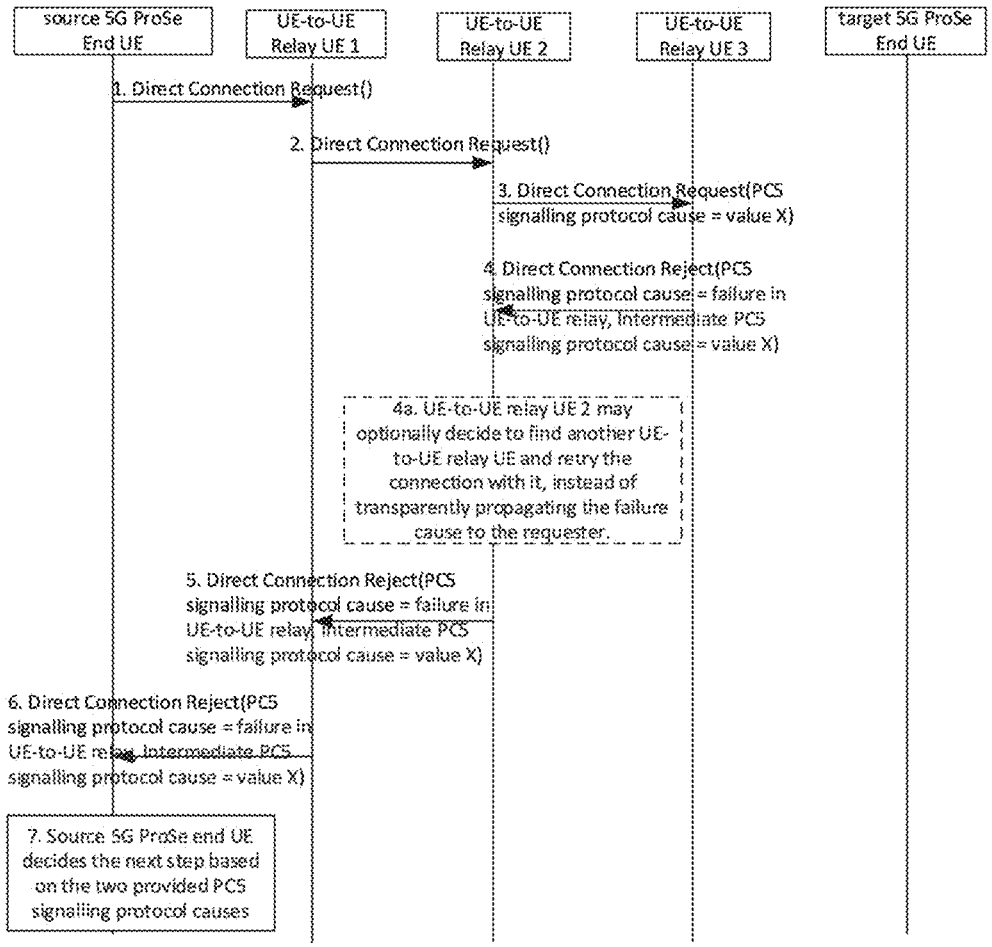
FIG. 15 illustrates an exemplary message sequence diagram corresponding to a method of relayed connection between nodes according to some embodiments of the subject disclosure (multi-hop scenario).

FIG. 15 illustrates an exemplary message sequence diagram corresponding to a method of relayed connection between nodes according to some embodiments of the subject disclosure. More specifically, the exemplary message sequence diagram of FIG. 15 concerns the multi-hop scenario as described above in case of failure/rejection by the (intermediate) relay node (e.g., the 5G ProSe UE-to-UE Relay 3).

As illustrated in FIG. 15, the connection from the source node (i.e., the source 5G ProSe End UE) to the target node (i.e., the target 5G ProSe End UE) is established via a plurality of relay nodes (i.e., the 5G ProSe UE-to-UE Relays 1-3).

In step 1, the source 5G ProSe End UE sends a Direct Communication Request message to initiate the link establishment procedure with the 5G ProSe UE-to-UE Relay 1. The Direct Communication Request message sent in step 1 corresponds to the communication request message for establishing a connection to a target node via a relay node as described in conjunction with block 610 of FIG. 6 and block 710 of FIG. 7.

In response to receiving the Direct Communication Request message, the 5G ProSe UE-to-UE Relay 1 sends a Direct Communication Request message to initiate the link establishment procedure with the 5G ProSe UE-to-UE Relay 2 (step 2). In response to receiving the Direct Communication Request message, the 5G ProSe UE-to-UE Relay 2 sends a Direct Communication Request message to initiate the link establishment procedure with the 5G ProSe UE-to-UE Relay 3 (step 2). With the Direct Communication Request messages sent in steps 2 and 3, the relay nodes initiate the procedure for establishing the direct connections between the relay nodes.

The link establishment procedure may fail due to a failure at or rejection by the 5G ProSe UE-to-UE Relay 3 and the 5G ProSe UE-to-UE Relay 3 sends a Direct Communication Reject message to the 5G ProSe UE-to-UE Relay 2 (step 4). The Direct Communication Reject message comprises an indication of the rejection by the 5G ProSe UE-to-UE Relay 3. For example, the Direct Communication Reject message (e.g., the PROSE DIRECT LINK ESTABLISHMENT REJECT message) may include an information element such as the PC5 signalling protocol cause IE used for signalling cause values. The PC5 signalling protocol cause IE may comprise a cause value (i.e., one or more cause values) indicating the rejection cause of the 5G ProSe UE-to-UE Relay 3 (e.g., value X shown in FIG. 15).

In response to receiving the Direct Communication Reject message from the 5G ProSe UE-to-UE Relay 3, the 5G ProSe UE-to-UE Relay 2 may decide next steps (step 4a) based on the indication of the rejection by the 5G ProSe UE-to-UE Relay 3 (e.g., one or more cause values provided in the existing PC5 signalling protocol cause IE and the intermediate PC5 signalling protocol cause IE). Examples for next steps in step 4a may comprise the procedures as described above with reference to block 630 of FIG. 6. For example, the 5G ProSe UE-to-UE Relay 2 may device to find another 5G ProSe UE-to-UE Relay and retry establishing a connection to the other 5G ProSe UE-to-UE Relay 3.

In response to receiving the Direct Communication Reject message from the 5G ProSe UE-to-UE Relay 3, the 5G ProSe UE-to-UE Relay 2 sends a Direct Communication Reject message to the 5G ProSe UE-to-UE Relay 1 (step 5). The Direct Communication Reject message comprises an indication of the rejection by the 5G ProSe UE-to-UE Relay 3. In other words, the 5G ProSe UE-to-UE Relay 2 propagates the indication of the rejection by the 5G ProSe UE-to-UE Relay 3 to 5G ProSe UE-to-UE Relay 1.

For example, the Direct Communication Reject message may comprise the PROSE DIRECT LINK ESTABLISHMENT REJECT message indicating a failure from the 5G ProSe UE-to-UE Relay 3. More specifically, the Direct Modification Reject message (e.g., the PROSE DIRECT LINK ESTABLISHMENT REJECT message) may include an information element such as the (existing) PC5 signalling protocol cause IE for signalling cause values of 5G ProSe UE-to-UE Relays. The (existing) PC5 signalling protocol cause IE may be extended to provide the indication of the rejection by the 5G ProSe UE-to-UE Relay 3. For example, the (existing) PC5 signalling protocol cause IE may indicate that the rejection is due to a failure or rejection from the 5G ProSe UE-to-UE Relay 3 (i.e., a failure in UE-to-UE Relay). In addition, the Direct Communication Reject message (e.g., the PROSE DIRECT LINK ESTABLISHMENT REJECT message) may further include a new PC5 signalling protocol cause IE (i.e., an intermediate PC5 signalling protocol cause IE) for signalling cause values of the (intermediate) 5G ProSe UE-to-UE Relays such as the 5G ProSe UE-to-UE Relay 3. The new PC5 signalling protocol cause IE may be optional and is included if the (existing) PC5 signalling protocol cause IE indicates the rejection by the (intermediate) 5G ProSe UE-to-UE Relay 3. The new PC5 signalling protocol cause IE may comprise one or more cause values for indicating the rejection cause of the (intermediate) 5G ProSe UE-to-UE Relay 3 (e.g., value X shown in FIG. 15), similar to the cause value indicating a rejection cause of the 5G ProSe UE-to-UE Relay.

In some examples, the Direct Communication Reject message may further comprise identification information indicating the relay node (i.e., relay UE info) to indicate the user info ID of the (intermediate) 5G ProSe UE-to-UE Relay 3 among the plurality of 5G ProSe UE-to-UE Relays involved in relaying the connection from the source 5G ProSe End UE to the target 5G ProSe End UE.

In response to receiving the Direct Communication Reject message from the 5G ProSe UE-to-UE Relay 2, the 5G ProSe UE-to-UE Relay 1 sends a Direct Communication Reject message to the source 5G ProSe End UE (step 6). The Direct Communication Reject message comprises an indication of the rejection by the 5G ProSe UE-to-UE Relay 3. In other words, the 5G ProSe UE-to-UE Relay 1 propagates the indication of the rejection by the 5G ProSe UE-to-UE Relay 3 to the source 5G ProSe End UE.

In response to receiving the Direct Communication Reject message from the 5G ProSe UE-to-UE Relay 1, the source 5G ProSe End UE may decide next steps (step 7) based on the indication of the rejection by the 5G ProSe UE-to-UE Relay 3 (e.g., one or more cause values provided in the existing PC5 signalling protocol cause IE and the intermediate PC5 signalling protocol cause IE). The next steps in step 7 may comprise the procedures as described above with reference to block 630 of FIG. 6.

It should be understood that, in the exemplary message sequence diagram of FIG. 15, existing connection(s) between nodes may exist such that procedure for modifying such existing connections may be performed instead of establishing (new) connections.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where enforcing fast connection re-establishment is required. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes exemplary embodiments, there are several variations and modifications which may be made to the disclosed solution without departing from the scope of the subject disclosure.

In general, the various exemplary embodiments may be implemented in hardware or special purpose circuits, software, logic, or any combination thereof. Some aspects of the subject disclosure may be implemented in hardware, while other aspects may be implemented in firmware or software which may be executed by a controller, microprocessor, or other computing device, although the subject disclosure is not limited thereto. While various aspects of the subject disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

Example embodiments of the subject disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the figures may represent program steps, or interconnected logic circuits, blocks and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory, and removable memory. The data processors may be of any type suitable to the local technical environment, and may comprise one or more of general-purpose computers, special purpose computers, microprocessors, digital signal processors (DSPs), application specific integrated circuits (ASICs), FPGA, gate level circuits and processors based on multi-core processor architecture, as non-limiting examples.

Example embodiments of the subject disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of the subject disclosure. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the subject disclosure as defined in the appended claims. Indeed, there is a further embodiment comprising a combination of one or more embodiments with any of the other embodiments previously discussed.

The invention claimed is:

1. A method for relayed connection between nodes, comprising:
   sending, from a source node to a relay node, a communication request message for establishing a connection to a target node via the relay node; and
   receiving, at the source node from the relay node, a communication reject message indicating a rejection to establish the connection by the target node;
   wherein the communication reject message, received at the source node from the relay node, comprises one or more cause values indicating that the rejection is due to rejection by the target node; and
   wherein the communication reject message comprises an additional information element for signaling cause values of the target node.

2. A method for relayed connection between nodes, comprising:
   receiving, at a relay node from a source node, a communication request message for establishing a connection to a target node via the relay node;
   establishing the connection to the target node; and
   responsive to receiving a rejection to establish the connection by the target node, sending, from the relay node to the source node, a communication reject message indicating the rejection to establish the connection by the target node;
   wherein the communication reject message, sent from the relay node to the source node, comprises one or more cause values indicating that the rejection is due to rejection by the target node; and
   wherein the communication reject message comprises an additional information element for signaling cause values of the target node.

3. An apparatus in a source node, comprising:
   at least one processor; and
   at least one memory including computer program code, wherein the computer program code causes the apparatus, when executed with the at least one processor, to:
   send, to a relay node, a communication request message for establishing a connection to a target node via the relay node; and
   receive, from the relay node, a communication reject message indicating a rejection to establish the connection by the target node;
   wherein the communication reject message, received at the source node from the relay node, comprises one or more cause values indicating that the rejection is due to rejection by the target node; and
   wherein the communication reject message comprises an additional information element for signaling cause values of the target node.

4. The apparatus of claim 3, wherein the computer program code further causes the apparatus, when executed with the at least one processor, to:
   responsive to receiving the communication reject message, retry to establish the connection to the target node by sending, to the relay node, another communication request message for establishing the connection to the target node via the relay node.

5. The apparatus of claim 4, wherein the computer program code further causes the apparatus, when executed with the at least one processor, to:

responsive to receiving the communication reject message, start a timer; and send the other communication request message responsive to lapse of the timer.

6. The apparatus of claim 3, wherein the computer program code further causes the apparatus, when executed with the at least one processor, to:

responsive to receiving the communication reject message, perform a relay reselection procedure to select another relay node; and send, to the other relay node, a communication request message for establishing the connection to the target node via the other relay node.

7. The apparatus of claim 3, wherein the computer program code further causes the apparatus, when executed with the at least one processor, to:

responsive to receiving the communication reject message, determine whether the rejection by the target node is permanent; and responsive to determining that the rejection is permanent, perform a discovery procedure to discover another target with which to establish the connection via the relay node or another relay node.

8. The apparatus of claim 3, wherein the computer program code further causes the apparatus, when executed with the at least one processor, to:

send, to the relay node, a communication request message for modifying an existing connection to the relay node to establish the connection to the target node; and receive, from the relay node, a communication reject message indicating a rejection to modify the existing connection due to rejection to establish the connection by the target node.

9. The apparatus of claim 8, wherein the communication request message for modifying the connection comprises a PROXIMITY SERVICE, PROSE, DIRECT LINK MODIFICATION REQUEST message and/or wherein the communication reject message indicating the rejection to modify the connection comprises a PROSE DIRECT LINK MODIFICATION REJECT message.

10. The apparatus of claim 3, wherein the computer program code further causes the apparatus, when executed with the at least one processor, to:

send, to the relay node, a communication request message for establishing the connection to the target node, by modifying an existing connection between the relay node and the target node; and receive, from relay node, a communication reject message indicating a rejection to establish the connection between source node and relay node due to rejection to modify the existing connection between the relay node and the target node.

11. An apparatus in a relay node, comprising:

at least one processor; and at least one memory including computer program code, wherein the computer program code causes the apparatus, when executed with the at least one processor, to:

receive, from a source node, a communication request message for establishing a connection to a target node via the relay node;

establish the connection to the target node; and responsive to receiving a rejection to establish the connection by the target node, send, to the source node, a communication reject message indicating the rejection to establish the connection by the target node;

wherein the communication reject message, sent from the relay node to the source node, comprises one or more cause values indicating that the rejection is due to rejection by the target node; and wherein the communication reject message comprises an additional information element for signaling cause values of the target node.

12. The apparatus of claim 11, wherein the computer program code further causes the apparatus, when executed with the at least one processor, to:

receive, from the source node, a communication request message for modifying an existing connection to the relay node to establish the connection to the target node;

responsive to receiving a rejection to establish the connection by the target node, send, to the source node, a communication reject message indicating a rejection to modify the existing connection due to rejection to establish the connection by the target node.

13. The apparatus of claim 11, wherein the computer program code further causes the apparatus, when executed with the at least one processor, to:

receive, from the source node, a communication request message for establishing the connection to the target node, by modifying an existing connection between the relay node and the target node; and send, to the source node, a communication reject message indicating a rejection to establish the connection between source node and relay node due to rejection to modify the existing connection between the relay node and the target node.

* * * * *